(12) United States Patent
Nonaka et al.

(10) Patent No.: US 9,044,669 B2
(45) Date of Patent: Jun. 2, 2015

(54) PROGRAM, INFORMATION STORAGE MEDIUM, AND IMAGE GENERATION SYSTEM

(75) Inventors: Toyokazu Nonaka, Kobe (JP); Takahiro Harada, Ritto (JP); Yasushi Ono, Yokohama (JP)

(73) Assignees: NINTENDO CO., LTD., Kyoto (JP); BANDAI NAMCO GAMES INC., Tokyo (JP)

( * ) Notice: Subject to any disclaimer, the term of this patent is extended or adjusted under 35 U.S.C. 154(b) by 1568 days.

(21) Appl. No.: 11/797,337

(22) Filed: May 2, 2007

(65) Prior Publication Data

US 2007/0270223 A1      Nov. 22, 2007

(30) Foreign Application Priority Data

May 8, 2006   (JP) .................................. 2006-129694

(51) Int. Cl.
    *A63F 13/00*   (2014.01)
    *A63F 13/20*   (2014.01)
    (Continued)

(52) U.S. Cl.
    CPC ............... *A63F 13/00* (2013.01); *A63F 13/211* (2014.09); *A63F 13/816* (2014.09); *A63F 13/812* (2014.09); *A63F 2300/1006* (2013.01);
    (Continued)

(58) Field of Classification Search
    CPC ... A63F 13/211; A63F 13/816; A63F 13/812; A63F 2300/105; A63F 2300/8011; A63F 2300/1006; A63F 2300/638; A63F 2300/646; A63F 2300/303; A63F 2300/6045
    USPC .......................................... 463/36–37, 31, 39
    See application file for complete search history.

(56) References Cited

U.S. PATENT DOCUMENTS

RE36,675  E  *  4/2000  Yamamoto et al. ............. 463/10
6,213,872  B1 *  4/2001  Harada et al. .................... 463/7
(Continued)

FOREIGN PATENT DOCUMENTS

EP   1 287 862 A2   3/2003
GB   2 355 169 A    4/2001
(Continued)

OTHER PUBLICATIONS

European Search Report issued in European Application No. 07742818.3 dated Feb. 28, 2012.
(Continued)

*Primary Examiner* — William H McCulloch, Jr.
(74) *Attorney, Agent, or Firm* — Oliff PLC

(57) ABSTRACT

An image generation system performs a game process of causing a game character to make a predetermined movement for a given object based on an operation input from an operation section including an acceleration sensor and causing the given object to move in an object space. The image generation system includes: an operation input detection section which detects whether or not a plurality of operation inputs including a first operation input and a second operation input for causing the game character to make a predetermined movement have been performed based on an output value from the acceleration sensor; a character movement control section which controls the game character to make a predetermined movement based on the first operation input; and an object movement control section which controls a movement state of the given object based on at least one of the first operation input and the second operation input.

23 Claims, 19 Drawing Sheets

(51) Int. Cl.
*A63F 13/21* (2014.01)
*A63F 13/211* (2014.01)
*A63F 13/56* (2014.01)
*A63F 13/812* (2014.01)
*A63F 13/816* (2014.01)

(52) U.S. Cl.
CPC .... *A63F 2300/646* (2013.01); *A63F 2300/105* (2013.01); *A63F 2300/303* (2013.01); *A63F 2300/6045* (2013.01); *A63F 2300/638* (2013.01); *A63F 2300/8011* (2013.01)

(56) References Cited

U.S. PATENT DOCUMENTS

| | | | |
|---|---|---|---|
| 6,302,789 | B2* | 10/2001 | Harada et al. ............ 463/7 |
| 6,312,335 | B1 | 11/2001 | Tosaki et al. |
| 6,375,572 | B1 | 4/2002 | Masuyama et al. |
| 6,517,438 | B2 | 2/2003 | Tosaki et al. |
| 6,641,482 | B2 | 11/2003 | Masuyama et al. |
| 6,645,067 | B1* | 11/2003 | Okita et al. ............ 463/7 |
| 6,685,480 | B2* | 2/2004 | Nishimoto et al. ........ 434/247 |
| 6,702,677 | B1* | 3/2004 | Fujisawa et al. ........ 463/43 |
| 6,921,332 | B2* | 7/2005 | Fukunaga et al. ........ 463/8 |
| 7,223,173 | B2* | 5/2007 | Masuyama et al. ........ 463/36 |
| 7,331,856 | B1* | 2/2008 | Nakamura et al. ........ 463/7 |
| 7,335,105 | B2 | 2/2008 | Ueshima |
| 7,352,358 | B2* | 4/2008 | Zalewski et al. ........ 345/156 |
| 7,352,359 | B2* | 4/2008 | Zalewski et al. ........ 345/156 |
| 7,391,409 | B2* | 6/2008 | Zalewski et al. ........ 345/156 |
| 7,424,388 | B2* | 9/2008 | Sato ............ 702/152 |
| 7,479,064 | B2* | 1/2009 | Wakitani et al. ........ 463/36 |
| 7,582,015 | B2* | 9/2009 | Onoda et al. ........ 463/30 |
| 7,618,322 | B2* | 11/2009 | Shimizu et al. ........ 463/36 |
| 7,627,139 | B2* | 12/2009 | Marks et al. ........ 382/103 |
| 7,628,699 | B2* | 12/2009 | Onoda et al. ........ 463/36 |
| 7,722,450 | B2* | 5/2010 | Onoda et al. ........ 463/7 |
| 7,834,848 | B2* | 11/2010 | Ohta ............ 345/157 |
| 7,850,527 | B2* | 12/2010 | Barney et al. ........ 463/7 |
| 7,854,656 | B2* | 12/2010 | Sato et al. ........ 463/36 |
| 7,872,638 | B2* | 1/2011 | Sato ............ 345/164 |
| 7,905,781 | B2* | 3/2011 | Koshima et al. ........ 463/37 |
| 7,905,782 | B2* | 3/2011 | Sawano et al. ........ 463/39 |
| 7,909,698 | B2* | 3/2011 | Onoda et al. ........ 463/36 |
| 8,033,914 | B2* | 10/2011 | Yoshikawa et al. ........ 463/36 |
| 8,192,285 | B2* | 6/2012 | Cheng et al. ........ 463/37 |
| 8,308,563 | B2* | 11/2012 | Ikeda et al. ........ 463/37 |
| 8,308,566 | B2* | 11/2012 | Nonaka et al. ........ 463/37 |
| 8,353,769 | B2* | 1/2013 | Okamura ........ 463/37 |
| 8,403,749 | B2* | 3/2013 | Yoshikawa et al. ........ 463/31 |
| 8,686,939 | B2* | 4/2014 | Mao et al. ........ 345/156 |
| 8,690,673 | B2* | 4/2014 | Horita et al. ........ 463/36 |
| 8,797,260 | B2* | 8/2014 | Mao et al. ........ 345/156 |
| 8,915,784 | B2* | 12/2014 | Yamanaka et al. ........ 463/37 |
| 2001/0007825 | A1* | 7/2001 | Harada et al. ........ 463/7 |
| 2001/0008849 | A1* | 7/2001 | Komata ........ 463/37 |
| 2003/0036417 | A1 | 2/2003 | Ueshima |
| 2003/0073492 | A1 | 4/2003 | Tosaki et al. |
| 2003/0078086 | A1 | 4/2003 | Matsuyama et al. |
| 2004/0029640 | A1 | 2/2004 | Masuyama et al. |
| 2005/0026675 | A1* | 2/2005 | Hatayama et al. ........ 463/17 |
| 2005/0085284 | A1* | 4/2005 | Onoda et al. ........ 463/7 |
| 2005/0085297 | A1* | 4/2005 | Onoda et al. ........ 463/37 |
| 2005/0096132 | A1* | 5/2005 | Ueshima et al. ........ 463/37 |
| 2005/0245315 | A1* | 11/2005 | Shimizu et al. ........ 463/37 |
| 2005/0288099 | A1* | 12/2005 | Shimizu et al. ........ 463/37 |
| 2006/0003825 | A1 | 1/2006 | Iwasaki et al. |
| 2006/0116203 | A1* | 6/2006 | Nakada et al. ........ 463/30 |
| 2006/0128468 | A1* | 6/2006 | Yoshikawa et al. ........ 463/36 |
| 2006/0252474 | A1* | 11/2006 | Zalewski et al. ........ 463/1 |
| 2006/0252475 | A1* | 11/2006 | Zalewski et al. ........ 463/1 |
| 2006/0252477 | A1* | 11/2006 | Zalewski et al. ........ 463/7 |
| 2006/0252541 | A1* | 11/2006 | Zalewski et al. ........ 463/36 |
| 2006/0258454 | A1* | 11/2006 | Brick ........ 463/36 |
| 2006/0287087 | A1* | 12/2006 | Zalewski et al. ........ 463/37 |
| 2007/0049374 | A1* | 3/2007 | Ikeda et al. ........ 463/30 |
| 2007/0060383 | A1* | 3/2007 | Dohta ........ 463/43 |
| 2007/0091084 | A1 | 4/2007 | Ueshima et al. |
| 2007/0211026 | A1* | 9/2007 | Ohta ............ 345/158 |
| 2007/0213109 | A1* | 9/2007 | Sato et al. ........ 463/3 |
| 2007/0213127 | A1* | 9/2007 | Sato ........ 463/36 |
| 2007/0270222 | A1* | 11/2007 | Yamanaka et al. ........ 463/37 |
| 2007/0270223 | A1* | 11/2007 | Nonaka et al. ........ 463/37 |
| 2008/0009348 | A1* | 1/2008 | Zalewski et al. ........ 463/40 |
| 2008/0119269 | A1* | 5/2008 | Nonaka et al. ........ 463/32 |
| 2008/0132334 | A1* | 6/2008 | Nonaka et al. ........ 463/37 |
| 2008/0254898 | A1 | 10/2008 | Endo |
| 2010/0144447 | A1* | 6/2010 | Nonaka et al. ........ 463/43 |
| 2010/0178988 | A1* | 7/2010 | Izuno et al. ........ 463/43 |
| 2010/0248824 | A1* | 9/2010 | Suzuki et al. ........ 463/30 |
| 2010/0248835 | A1* | 9/2010 | Suzuki et al. ........ 463/36 |
| 2010/0248836 | A1* | 9/2010 | Suzuki et al. ........ 463/36 |
| 2010/0248837 | A1* | 9/2010 | Suzuki et al. ........ 463/36 |
| 2010/0323783 | A1* | 12/2010 | Nonaka et al. ........ 463/23 |
| 2011/0053691 | A1* | 3/2011 | Bryant et al. ........ 463/37 |
| 2011/0065488 | A1* | 3/2011 | Okamura et al. ........ 463/3 |
| 2011/0065508 | A1* | 3/2011 | Ishii et al. ........ 463/36 |
| 2011/0077065 | A1* | 3/2011 | Sandoval et al. ........ 463/3 |
| 2014/0315641 | A1* | 10/2014 | Rabin ........ 463/37 |

FOREIGN PATENT DOCUMENTS

| | | |
|---|---|---|
| JP | A 06-190144 | 7/1994 |
| JP | A 06-198075 | 7/1994 |
| JP | A 10-179934 | 7/1998 |
| JP | A 10-214155 | 8/1998 |
| JP | A-10-214155 | 8/1998 |
| JP | A-10-320591 | 12/1998 |
| JP | A-2000-107444 | 4/2000 |
| JP | A 2000-157745 | 6/2000 |
| JP | A 2000-308756 | 11/2000 |
| JP | A 2001-104636 | 4/2001 |
| JP | A 2001-170358 | 6/2001 |
| JP | A 2001-321564 | 11/2001 |
| JP | A-2002-058873 | 2/2002 |
| JP | A 2002-082768 | 3/2002 |
| JP | A 2002-210240 | 7/2002 |
| JP | A-2003-053032 | 2/2003 |
| JP | A 2003-053032 | 2/2003 |
| JP | A 2003-126548 | 5/2003 |
| JP | A 2003-181137 | 7/2003 |
| JP | A 2003-205172 | 7/2003 |
| JP | A 2005-046422 | 2/2005 |
| JP | A-2005-046422 | 2/2005 |
| JP | A 2005-323827 | 11/2005 |
| JP | A 2005-339088 | 12/2005 |
| JP | A-2007-167533 | 7/2007 |
| JP | A 2007-167533 | 7/2007 |

OTHER PUBLICATIONS

Hudson, Baku Bomberman, manual of game software, 1997, pp. 2-7 (with partial translation).
Jikkyou Pawafuru Puroyakyuu 10, Konami Official Guidebook Series 105, Jan. 30, 2004, First edition, p. 4 (with partial translation).
"An Especially Legitimate Bowling Game is Now Released!," *Nintendo 64*, Super Bowling, Apr. 1, 1999, pp. 74-77, vol. 4, Issue 4, Media Works (w/ Partial English Translation).

* cited by examiner

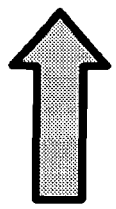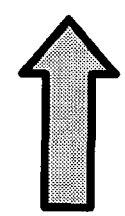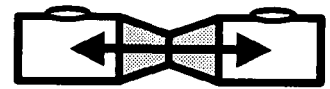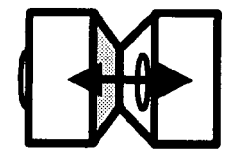
FIG.3A
FIG.3B

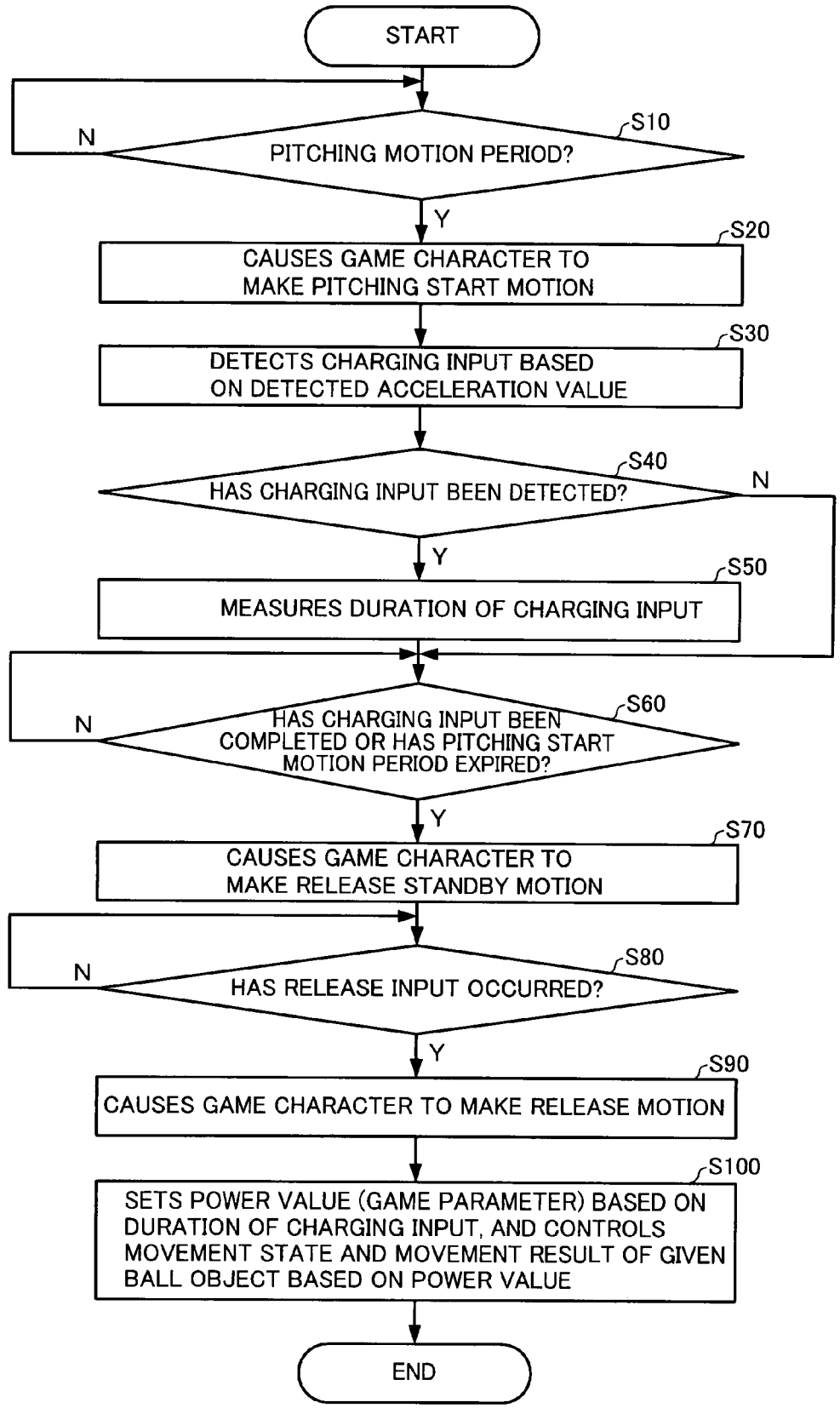

PROGRAM, INFORMATION STORAGE MEDIUM, AND IMAGE GENERATION SYSTEM

Japanese Patent Application No. 2006-129694, filed on May 8, 2006, is hereby incorporated by reference in its entirety.

BACKGROUND OF THE INVENTION

The present invention relates to a program, an information storage medium, and an image generation system.

In recent years, a game system has been developed which includes a sensor which can detect vibration (e.g. acceleration sensor) provided in a game controller and detects the movement of the controller as a game input.

Since such a game system allows the player to input a predetermined command by shaking the controller or making a predetermined movement, an exciting game can be provided in which the player can input a command by moving the controller by making a movement similar to the movement in the game. JP-A-2000-107444 discloses technology in this field, for example.

Future tasks are to effectively utilize an operation input using such a controller and reflect the operation input in the game.

SUMMARY

According to a first aspect of the invention, there is provided a program causing a computer to function as:

a game processing section which performs a game process of causing a game character to make a predetermined movement for a given object based on an operation input from an operation section including a movement sensor and causing the given object to move in an object space; and an image generation section which generates an image of the object space viewed from a virtual camera;

the game processing section including:

an operation input detection section which detects whether or not a plurality of operation inputs including a first operation input and a second operation input for causing the game character to make a predetermined movement have been performed based on an output value from the movement sensor;

a character movement control section which controls the game character to make a predetermined movement based on the first operation input; and an object movement control section which controls a movement state of the given object based on at least one of the first operation input and the second operation input.

According to a second aspect of the invention, there is provided a program causing a computer to function as:

a game processing section which performs a game process of causing a game character to make a predetermined movement for a given object based on an operation input from an operation section including a movement sensor and causing the given object to move in an object space; and an image generation section which generates an image of the object space viewed from a virtual camera;

the game processing section including:

an operation input detection section which detects whether or not an operation input for causing the game character to make a predetermined movement has been performed based on an output value from the movement sensor;

a character movement control section which controls the game character to make a predetermined movement based on the operation input; and an object movement control section which controls a movement state of the given object based on the operation input for causing the game character to make a predetermined movement.

According to a third aspect of the invention, there is provided a program causing a computer to function as:

a game processing section which performs a game process of causing a game character to make a predetermined movement for a given object based on an operation input from an operation section including a movement sensor and causing the given object to move in an object space; and an image generation section which generates an image of the object space viewed from a virtual camera;

the game processing section including:

an operation input detection section which detects whether or not a first operation input and a second operation input for causing the game character to make a predetermined movement have been performed based on an output value from the movement sensor;

an object movement control section which controls a movement state and a movement result of the given object based on the first operation input; and a character movement control section which controls the game character to make a predetermined movement based on the second operation input.

According to a fourth aspect of the invention, there is provided a program causing a computer to function as:

a game processing section which performs a game process of causing a game character to make a predetermined movement for a given object based on an operation input from an operation section including a movement sensor and causing the given object to move in an object space; and an image generation section which generates an image of the object space viewed from a virtual camera;

the game processing section including:

an operation input detection section which detects whether or not operation inputs including a first operation input and a second operation input for causing the game character to make a predetermined movement have been performed based on an output value from the movement sensor; and a movement control section which controls the game character to make a first movement set corresponding to the first operation input based on the first operation input, and controls the game character to make a second movement set corresponding to the second operation input based on the second operation input.

According to a fifth aspect of the invention, there is provided a computer-readable information storage medium storing any of the above-described programs.

According to a sixth aspect of the invention, there is provided an image generation system comprising:

a game processing section which performs a game process of causing a game character to make a predetermined movement for a given object based on an operation input from an operation section including a movement sensor and causing the given object to move in an object space; and an image generation section which generates an image of the object space viewed from a virtual camera;

the game processing section including:

an operation input detection section which detects whether or not a plurality of operation inputs including a first operation input and a second operation input for causing the game character to make a predetermined movement have been performed based on an output value from the movement sensor;

a character movement control section which controls the game character to make a predetermined movement based on the first operation input; and an object movement control section which controls a movement state of the given object based on at least one of the first operation input and the second operation input.

According to a seventh aspect of the invention, there is provided an image generation system comprising:

a game processing section which performs a game process of causing a game character to make a predetermined movement for a given object based on an operation input from an operation section including a movement sensor and causing the given object to move in an object space; and an image generation section which generates an image of the object space viewed from a virtual camera;

the game processing section including:

an operation input detection section which detects whether or not an operation input for causing the game character to make a predetermined movement has been performed based on an output value from the movement sensor;

a character movement control section which controls the game character to make a predetermined movement based on the operation input; and an object movement control section which controls a movement state of the given object based on the operation input for causing the game character to make a predetermined movement.

According to a eighth aspect of the invention, there is provided an image generation system comprising:

a game processing section which performs a game process of causing a game character to make a predetermined movement for a given object based on an operation input from an operation section including a movement sensor and causing the given object to move in an object space; and an image generation section which generates an image of the object space viewed from a virtual camera;

the game processing section including:

an operation input detection section which detects whether or not a first operation input and a second operation input for causing the game character to make a predetermined movement have been performed based on an output value from the movement sensor;

an object movement control section which controls a movement state and a movement result of the given object based on the first operation input; and a character movement control section which controls the game character to make a predetermined movement based on the second operation input.

According to a ninth aspect of the invention, there is provided an image generation system comprising:

a game processing section which performs a game process of causing a game character to make a predetermined movement for a given object based on an operation input from an operation section including a movement sensor and causing the given object to move in an object space; and an image generation section which generates an image of the object space viewed from a virtual camera;

the game processing section including:

an operation input detection section which detects whether or not operation inputs including a first operation input and a second operation input for causing the game character to make a predetermined movement have been performed based on an output value from the movement sensor; and a movement control section which controls the game character to make a first movement set corresponding to the first operation input based on the first operation input, and controls the game character to make a second movement set corresponding to the second operation input based on the second operation input.

BRIEF DESCRIPTION OF THE SEVERAL VIEWS OF THE DRAWING

FIGS. 3A and 3B are views illustrative of an operation input example by shaking a controller.

FIG. 6 is a flowchart showing an example of the flow of a process during a charging-to-release movement (configuration A).

DETAILED DESCRIPTION OF THE EMBODIMENT

Figure 1:
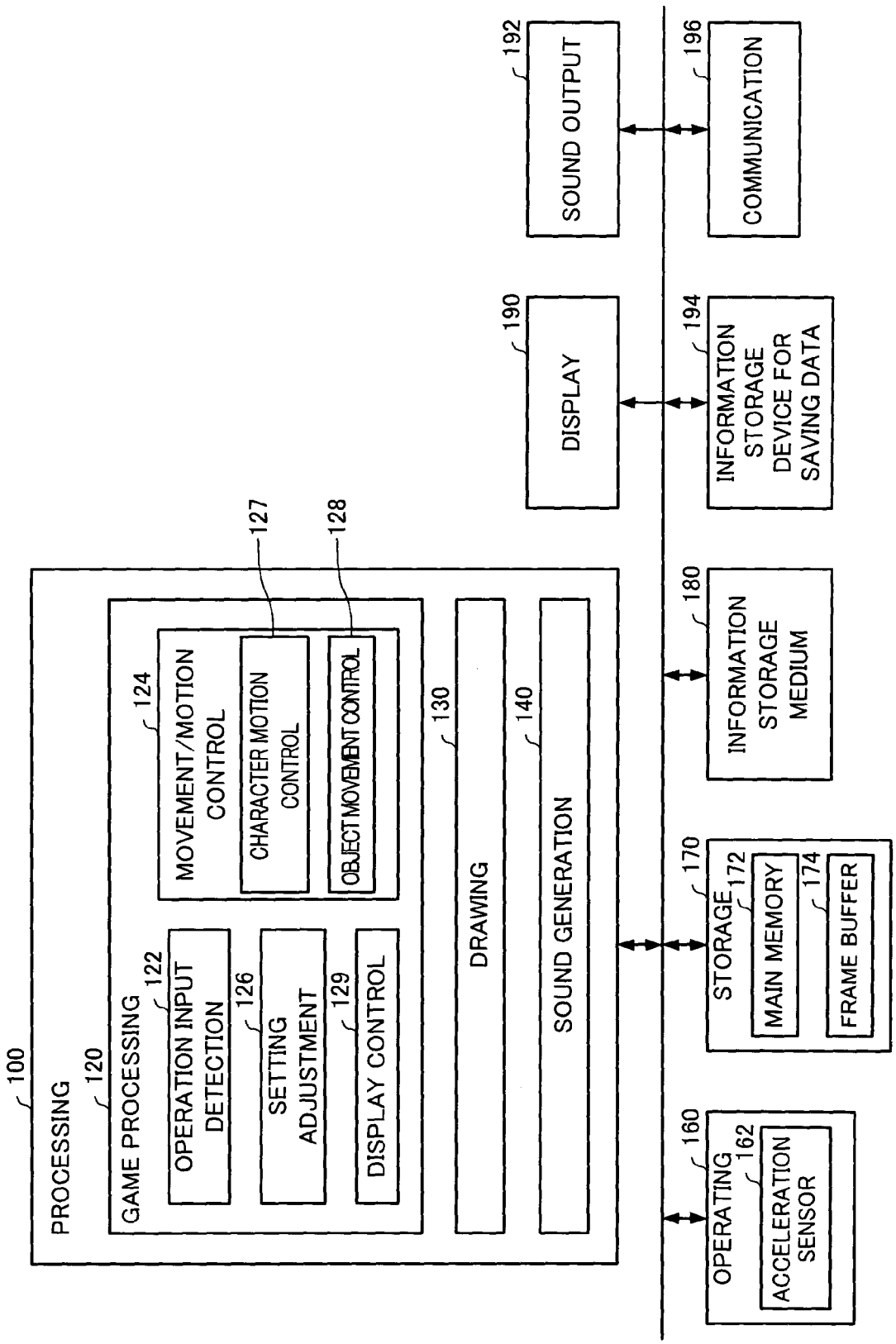
FIG. 1 shows an example of a functional block diagram of an image generation system according to one embodiment of the invention.

An object of the invention is to provide a program, an information storage medium, and an image generation system exhibiting excellent reflection of an operation input in a game and allowing a player to play a game with an excellent operation feel in the game in which an operation input is performed by moving a controller.

(1) According to one embodiment of the invention, there is provided a program causing a computer to function as:

a game processing section which performs a game process of causing a game character to make a predetermined movement for a given object based on an operation input from an operation section including a movement sensor and causing the given object to move in an object space; and an image generation section which generates an image of the object space viewed from a virtual camera;

the game processing section including:

an operation input detection section which detects whether or not a plurality of operation inputs including a first operation input and a second operation input for causing the game character to make a predetermined movement have been performed based on an output value from the movement sensor;

a character movement control section which controls the game character to make a predetermined movement based on the first operation input; and an object movement control section which controls a movement state of the given object based on at least one of the first operation input and the second operation input.

According to one embodiment of the invention, there is provided an image generation system comprising the above-described sections. According to one embodiment of the invention, there is provided a computer-readable information storage medium storing a program which causes a computer to function as the above-described sections.

The movement sensor may be formed using an acceleration sensor, a velocity sensor, a sensor which measures displacement, or the like.

The term "predetermined movement" refers to a movement such as a pitching movement, a kicking movement, a hitting movement, or a beating movement. The term "given object" for which the game character makes a predetermined movement refers to an object such as a ball.

The first operation input may be an operation input for causing the game character to make a predetermined movement such as a pitching movement, a kicking movement, a hitting movement, or a beating movement, and the second operation input may be an operation input separately performed after the first operation input.

The second operation input may be an operation input which can be detected accompanying the first operation input. For example, the presence or absence of a movement of shaking a controller may be handled as the first operation input, and the orientation, the magnitude, and the like detected by the shaking movement may be handled as the second operation input.

The movement state of the given object includes a moving direction, a moving path, a moving velocity, and a moving pattern.

The first operation input may include a plurality of input steps. For example, a ready movement and a windup movement may be input in two stages during a pitching movement.

The second operation input may include a plurality of input steps. For example, a plurality of input steps may be provided such as a charging movement, a release movement, and a ball direction control movement during a pitching movement.

According to this embodiment, the movement of the game character and the movement state of the given object can be controlled by performing the operation input by operating the controller.

(2) In each of the above image generation system, program, and information storage medium, the character movement control section may control the game character to make a predetermined movement based on the first operation input; and the object movement control section may control the movement state of the given object based on the second operation input.

(3) In each of the above image generation system, program, and information storage medium, the operation input detection section may detect whether or not the operation input has been performed based on the output value from the movement sensor and an operation input from an operation input section other than the movement sensor provided in the operation section.

The operation input section other than the movement sensor may be a button, an cross key, or the like provided on the controller, for example.

For example, the details of the first operation input and the second operation input may be determined in addition to the presence or absence, commencement, or completion of the first operation input and the second operation input.

(4) In each of the above image generation system, program, and information storage medium, the object movement control section may control at least one of a moving direction, a moving path, and a moving pattern of the given object based on at least one of the first operation input and the second operation input.

(5) In each of the above image generation system, program, and information storage medium, the object movement control section may detect information on orientation or rotation based on at least one of the first operation input and the second operation input, and control at least one of a moving direction, a moving path, and a moving pattern of the given object based on the information on orientation or rotation.

(6) According to one embodiment of the invention, there is provided a program causing a computer to function as:

a game processing section which performs a game process of causing a game character to make a predetermined movement for a given object based on an operation input from an operation section including a movement sensor and causing the given object to move in an object space; and an image generation section which generates an image of the object space viewed from a virtual camera;

the game processing section including:

an operation input detection section which detects whether or not an operation input for causing the game character to make a predetermined movement has been performed based on an output value from the movement sensor;

a character movement control section which controls the game character to make a predetermined movement based on the operation input; and an object movement control section which controls a movement state of the given object based on the operation input for causing the game character to make a predetermined movement.

According to one embodiment of the invention, there is provided an image generation system comprising the above-described sections. According to one embodiment of the invention, there is provided a computer-readable information storage medium storing a program which causes a computer to function as the above-described sections.

The movement sensor may be formed using an acceleration sensor, a velocity sensor, a sensor which measures displacement, or the like.

The term "predetermined movement" refers to a movement such as a pitching movement, a kicking movement, a hitting movement, or a beating movement. The term "given object" for which the game character makes a predetermined movement refers to an object such as a ball.

The movement state of the given object includes a moving direction, a moving path, a moving velocity, and a moving pattern.

According to this embodiment, the movement of the game character and the movement state of the given object can be controlled by performing the operation input by operating the controller.

(7) In each of the above image generation system, program, and information storage medium, the object movement control section may detect information on orientation or rotation based on the operation input for causing the game character to make a predetermined movement, and control at least one of a moving direction, a moving path, and a moving pattern of the given object based on the information on orientation or rotation.

(8) According to one embodiment of the invention, there is provided a program causing a computer to function as:

a game processing section which performs a game process of causing a game character to make a predetermined movement for a given object based on an operation input from an operation section including a movement sensor and causing the given object to move in an object space; and an image generation section which generates an image of the object space viewed from a virtual camera;

the game processing section including:

an operation input detection section which detects whether or not a first operation input and a second operation input for causing the game character to make a predetermined movement have been performed based on an output value from the movement sensor;

an object movement control section which controls a movement state and a movement result of the given object based on the first operation input; and a character movement control section which controls the game character to make a predetermined movement based on the second operation input.

According to one embodiment of the invention, there is provided an image generation system comprising the above-described sections. According to one embodiment of the invention, there is provided a computer-readable information storage medium storing a program which causes a computer to function as the above-described sections.

The movement sensor may be formed using an acceleration sensor, a velocity sensor, a sensor which measures displacement, or the like.

The term "predetermined movement" refers to a movement such as a pitching movement, a kicking movement, a hitting movement, or a beating movement. The term "given object" for which the game character makes a predetermined movement refers to an object such as a ball.

The first operation input is an operation input performed before the second operation input. The first operation input is a ball control operation input, for example. The second operation input is an operation input for causing the game character to make a predetermined movement such as a pitching movement, a kicking movement, a hitting movement, or a beating movement.

In this embodiment, the first operation input and the second operation input may be independent operation inputs.

The movement state of the given object includes a moving direction, a moving path, a moving velocity, a moving pattern, and a degree and accuracy of movement. The movement result includes a safe/out result, the probability that a ball enters the strike zone, and the like.

According to this embodiment, the movement of the game character and the movement state and the movement result of the given object can be controlled by performing the operation input by operating the controller.

The first operation input and the second operation input may include a plurality of input steps.

(9) In each of the above image generation system, program, and information storage medium, the object movement control section may set a power value as a game parameter based on the first operation input, and control the movement state and the movement result of the given object based on the power value.

The first operation input is an operation input performed before the second operation input. The first operation input is a power charging operation input, for example.

(10) In each of the above image generation system, program, and information storage medium, the object movement control section may control the game character to make a movement for storing the power value based on the first operation input.

(11) In each of the above image generation system, program, and information storage medium, the operation input detection section may detect whether or not the operation section is held in a predetermined posture based on the output value from the movement sensor, and determine that the first operation input has been performed when the operation section is held in the predetermined posture.

(12) In each of the above image generation system, program, and information storage medium, the operation input detection section may determine presence or absence of the first operation input, or start or completion of the first operation input based on the output value from the movement sensor and an operation input from an operation input section other than the movement sensor provided in the operation section.

(13) In each of the above image generation system, program, and information storage medium, the object movement control section may detect duration of the first operation input, and determine a power value stored by the first operation input based on the duration.

(14) In each of the above image generation system, program, and information storage medium, the operation input detection section may set a first operation input acceptance time, and may not accept the first operation input when the acceptance time has expired.

(15) According to one embodiment of the invention, there is provided a program causing a computer to function as:

a game processing section which performs a game process of causing a game character to make a predetermined movement for a given object based on an operation input from an operation section including a movement sensor and causing the given object to move in an object space; and an image generation section which generates an image of the object space viewed from a virtual camera;

the game processing section including:

an operation input detection section which detects whether or not operation inputs including a first operation input and a second operation input for causing the game character to make a predetermined movement have been performed based on an output value from the movement sensor; and a movement control section which controls the game character to make a first movement set corresponding to the first operation input based on the first operation input, and controls the game character to make a second movement set corresponding to the second operation input based on the second operation input.

According to one embodiment of the invention, there is provided an image generation system comprising the above-described sections. According to one embodiment of the invention, there is provided a computer-readable information storage medium storing a program which causes a computer to function as the above-described sections.

The movement sensor may be formed using an acceleration sensor, a velocity sensor, a sensor which measures displacement, or the like.

The term "predetermined movement" refers to a movement such as a pitching movement, a kicking movement, a hitting movement, or a beating movement. The term "given object" for which the game character makes a predetermined movement refers to an object such as a ball.

According to this embodiment, the game character can be caused to make a combined movement including a plurality of movements by operating the controller.

The movements may include a first operation input, a second operation input, and a third operation input. The game character may be caused to make a first movement set corresponding to the first operation input based on the first operation input, make a second movement set corresponding to the second operation input based on the second operation input, and make a third movement set corresponding to the third operation input based on the third operation input.

Taking a pitching movement as an example, the first movement may be a pitching start movement (e.g. windup movement), the second movement may be a stop movement in a windup state, and the third movement may be a released movement.

(16) In each of the above image generation system, program, and information storage medium, the game processing section may include a character movement control section which controls the game character to make a predetermined movement based on at least one of the first operation input and the second operation input.

According to this embodiment, the movement of the game character and the movement state and the movement result of the given object can be controlled by performing the operation input by operating the controller.

(17) In each of the above image generation system, program, and information storage medium, the operation input detection section may determine that the first operation input or the second operation input has been performed when detecting that the operation section is held in a predetermined posture or remains stationary based on the output value from the movement sensor.

For example, when the operation input detection section detects whether or not the first operation input, the second operation input, and the third operation input for causing the game character to make a predetermined movement have been performed based on the output value from the movement sensor, the operation input detection section may determine that the second operation input has been performed when detecting that the operation section is held in a predetermined posture or remains stationary based on the output value from the movement sensor.

This facilitates control so that the game character on the game screen makes the first movement based on the first operation input performed by the player, makes the second movement based on the second operation input performed by the player, and makes the third movement based on the third operation input performed by the player.

Therefore, the operation input of the player and the movement of the game character on the game screen can be synchronized, whereby the movement of the player can be further reflected in the game screen.

(18) In each of the above image generation system, program, and information storage medium, the game processing section may include an adjustment section which sets an initial setting operation period in which an initial setting operation input is accepted, and adjust a reference value for determining the output value from the movement sensor based on the output value from the movement sensor obtained by the operation section in the initial setting operation period; and the operation input detection section may detect the operation input by determining the output value from the movement sensor based on the adjusted reference value.

(19) In each of the above image generation system, program, and information storage medium, the game processing section may include a movement display object display control section which performs a display control process of a movement display object for displaying information of the movement of the game character performed when the operation inputs have been detected; and the image generation section may generate a game image including the movement display object.

(20) In each of the above image generation system, program, and information storage medium, the game processing section may include a movement state display object display control section which performs a display control process of a movement state display object for displaying information about control of the movement state of an object performed when the operation inputs have been detected; and the image generation section may generate a game image including the movement state display object.

The information of control of the movement state of the object includes information of the power value.

(21) In each of the above image generation system, program, and information storage medium, the operation input detection section may set a time limit corresponding to each of the operation inputs, and may not accept each operation input when the time limit for each operation input has expired.

(22) In each of the above image generation system, program, and information storage medium, the operation input detection section may set a total time limit for the operation inputs, set a time limit for a subsequent operation input based on a time required for a preceding operation input and the total time limit, and may not accept an operation input when the set time limit has expired.

(23) In each of the above image generation system, program, and information storage medium, the operation input detection section may detect whether or not the operation inputs have been performed based on an output value from a first movement sensor provided in a first controller and an output value from a second movement sensor provided in a second controller.

The embodiments of the invention will be described below. Note that the embodiments described below do not unduly limit the scope of the invention laid out in the claims herein. In addition, not all of the elements of the embodiments described below should be taken as essential requirements of the invention.

1. Configuration

An image generation system (game system) according to one embodiment of the invention is described below with reference to FIG. 1. FIG. 1 shows an example of a functional configuration of the image generation system according to this embodiment. Note that some of the elements (sections) may be omitted from the image generation system according to this embodiment.

An operating section 160 allows a player to input operation data. The function of the operating section 160 may be implemented by a lever, a button, a steering wheel, a microphone, or the like.

The operation section 160 includes an acceleration sensor 162 (example of movement sensor), and detects an acceleration vector which occurs corresponding to the movement, the posture, and the orientation of the operation section.

For example, a controller including the acceleration sensor 162 may be used as the operation section 160.

The acceleration sensor 162 detects the acceleration corresponding to the movement, the posture, and the orientation of the controller, and outputs the detected acceleration information (output value). The acceleration sensor 162 may be implemented by piezoelectric type, electrodynamic type, or strain gauge type hardware, for example.

A storage section 170 serves as a work area for a processing section 100, a communication section 196, and the like. The function of the storage section 170 may be implemented by a RAM (VRAM) or the like.

An information storage medium 180 (computer-readable medium) stores a program, data, and the like. The function of the information storage medium 180 may be implemented by an optical disk (CD or DVD), a hard disk, a memory card, a memory cassette, a magnetic disk, a memory (ROM), or the like. The processing section 100 performs various processes according to this embodiment based on a program (data) stored in the information storage medium 180. Specifically, a program for causing a computer to function as each section according to this embodiment (program for causing a computer to execute the process of each section) is stored in the information storage medium 180.

A display section 190 outputs an image generated according to this embodiment. The function of the display section 190 may be implemented by a CRT, a liquid crystal display (LCD), a touch panel display, a head mount display (HMD), or the like.

A sound output section 192 outputs sound generated according to this embodiment. The function of the sound output section 192 may be implemented by a speaker, a headphone, or the like.

A portable information storage device 194 stores player's personal data, game save data, and the like. As the portable information storage device 194, a memory card, a portable game device, and the like can be given. The communication section 196 performs various types of control for communicating with the outside (e.g. host device or another image generation system). The function of the communication section 196 may be implemented by hardware such as a processor or a communication ASIC, a program, or the like.

The program (data) for causing a computer to function as each section according to this embodiment may be distributed to the information storage medium 180 (storage section 170) from an information storage medium included in a host device (server) through a network and the communication section 196. Use of the information storage medium of the host device (server) is also included within the scope of this embodiment.

The processing section 100 (processor) performs various processes such as issuance of instructions to each functional block, a game process, an image generation process, and a sound generation process. The game process includes a process of starting a game when game start conditions have been satisfied, a process of proceeding with a game, a process of disposing an object such as a character or a map, a process of displaying an object, a process of calculating game results, a process of finishing a game when game end conditions have been satisfied, and the like.

The function of the processing section 100 may be implemented by hardware such as a processor (e.g. CPU or DSP) or ASIC (e.g. gate array) and a program. The processing section 100 performs various processes using the storage section 170 as a work area.

The processing section 100 includes a game processing section 110, a drawing section 130, and a sound generation section 150. Note that the game processing section 110 may have a configuration in which some of these sections are omitted.

The game processing section 110 includes an operation input detection section 122, a movement/motion control section 124, a setting adjustment section 126, and a display control section 129. The movement/motion control section 124 includes a character motion control section 127 and an object movement control section 128.

The operation input detection section 122 may detect whether or not a plurality of operation inputs including a first operation input and a second operation input for causing a game character to make a predetermined movement have been performed based on the output value from the acceleration sensor, the character movement control section 127 may control the game character to make a predetermined movement based on the first operation input, and the object movement control section 128 may control the movement state of a given object based on at least one of the first operation input and the second operation input.

The character movement control section 127 may control the game character to make a predetermined movement based on the first operation input, and the object movement control section 128 may control the movement state of a given object based on the second operation input.

The operation input detection section 122 may detect whether or not the operation input has been performed based on the output value from the acceleration sensor and an operation input from an operation input section other than the acceleration sensor provided in the operation section.

The object movement control section 128 may control at least one of the moving direction, the moving path, and the moving pattern of a given object based on at least one of the first operation input and the second operation input.

The object movement control section 128 may detect information on orientation or rotation based on at least one of the first operation input and the second operation input, and control at least one of the moving direction, the moving path, and the moving pattern of a given object based on the information on orientation or rotation.

The operation input detection section 122 may detect whether or not the operation input for causing the game character to make a predetermined movement has been performed based on the output value from the acceleration sensor, the character movement control section 127 may control the game character to make a predetermined movement based on the operation input, and the object movement control section 128 may control the movement state of a given object based on the operation input for causing the game character to make a predetermined movement.

The object movement control section 128 may detect information on orientation or rotation based on the operation input for causing the game character to make a predetermined movement, and control at least one of the moving direction, the moving path, and the moving pattern of a given object based on the information on orientation or rotation.

The operation input detection section 122 may detect whether or not the first operation input and the second operation input for causing the game character to make a predetermined movement have been performed based on the output value from the acceleration sensor, the object movement control section 128 may control the movement state and the movement result of a given object based on the first operation input, and the character movement control section 127 may control the game character to make a predetermined movement based on the second operation input.

The object movement control section 128 may set a power value (game parameter) based on the first operation input, and control the movement state and the movement result of a given object based on the power value.

The object movement control section 128 may control the game character to make a movement for storing the power value based on the first operation input.

The operation input detection section 122 may detect whether or not the operation section is held in a predetermined posture based on the output value from the acceleration sensor, and determine that the first operation input has been performed when the operation section is held in a predetermined posture.

The operation input detection section 122 may determine the presence or absence, commencement, or completion of the first operation input based on the output value from the acceleration sensor and an operation input from an operation input section other than the acceleration sensor provided in the operation section.

The object movement control section 128 may detect the duration of the first operation input, and determine the power value stored by the operation based on the duration.

The operation input detection section 122 may set a first operation input acceptance time, and may not accept the first operation input when the acceptance time has expired.

The operation input detection section 122 may detect whether or not the operation inputs including the first operation input and the second operation input for causing the game character to make a predetermined movement have been performed based on the output value from the acceleration sensor, the character movement control section 127 may control the game character to make a first movement set corresponding to the first operation input based on the first operation input, and the object movement control section 128 may control the game character to make a second movement set corresponding to the second operation input based on the second operation input.

The character movement control section 127 may include a section which controls the game character to make a predetermined movement based on at least one of the first operation input and the second operation input.

The operation input detection section 122 may determine that the first operation input or the second operation input has been performed when detecting that the operation section is held in a predetermined posture or remains stationary based on the output value from the acceleration sensor.

The setting adjustment section 126 sets an initial setting operation period in which an initial setting operation input is accepted, and adjusts a reference value when determining the output value from the acceleration sensor based on the output value from the acceleration sensor obtained by the operation section in the initial setting operation period.

The operation input detection section 122 may detect the operation input by determining the output value from the acceleration sensor based on the adjusted reference value.

The display control section 129 may perform a display control process of a movement display object for displaying information about the movement of the game character performed when the operation input has been detected.

The display control section 129 may perform a display control process of a movement state display object for displaying information about object movement state control performed when the operation input has been detected.

The operation input detection section 122 may set a time limit corresponding to each of a series of operation inputs, and may not accept each operation input when the time limit for each operation input has expired.

The operation input detection section 122 may set a total time limit for a series of operation inputs, set the time limit for the subsequent operation input based on the time required for the preceding operation input and the total time limit, and may not accept each operation input when the set time limit has expired.

The operation input detection section 122 may detect whether or not the operation input has been performed based on an output value from a first acceleration sensor provided in a first controller and an output value from a second acceleration sensor provided in a second controller.

The movement/motion control section 124 calculates the movement/motion (movement/motion simulation) of an object such as a moving object (e.g. character, car, or airplane). Specifically, the movement/motion processing section 124 causes an object (moving object) to move in an object space or to make a movement (motion or animation) based on the operational data input by the player using the operation section 160, a program (movement/motion algorithm), various types of data (motion data), and the like.

In more detail, the movement/motion processing section 124 according to this embodiment performs a simulation process of sequentially calculating movement information (position, rotational angle, velocity, or acceleration) and motion information (position or rotational angle of each part object) of the object in frame (1/60 sec) units. The frame is a time unit for performing the object movement/motion process (simulation process) and the image generation process.

The movement/motion processing section 124 may control at least one of the rotation, the posture, the movement, and the moving direction of the operation target object in the object space based on a calculated orientation/rotation parameter.

The game processing section 110 may include an object space setting section (not shown). The object space setting section disposes in the object space various objects (objects formed by a primitive surface such as a polygon, a free-form surface, or a subdivision surface) representing display objects such as a character, a car, a tank, a building, a tree, a pillar, a wall, or a map (topography). Specifically, the object space setting section determines the position and the rotational angle (synonymous with orientation or direction) of an object (model object) in a world coordinate system, and disposes the object at the determined position (X, Y, Z) and the determined rotational angle (rotational angles around X, Y, and Z axes).

The game processing section 110 may include a virtual camera control section (not shown). The virtual camera control section controls the position, the rotation (orientation), and the like of a virtual camera based on the input from the player.

The drawing section 130 performs a drawing process based on results for various processes (game processes) performed by the game processing section 120 to generate an image, and outputs the image to the display section 190. When generating a three-dimensional game image, object data (model data) including vertex data (e.g. vertex position coordinates, texture coordinates, color data, normal vector, or alpha value) of each vertex of the object (model) is input, and a vertex process is performed based on the vertex data included in the input object data.

When performing the vertex process, a vertex generation process (tessellation, curved surface division, or polygon division) for subdividing the polygon may be performed, if necessary.

In the vertex process, a vertex movement process and a geometric process such as coordinate transformation (world coordinate transformation or camera coordinate transformation), clipping, perspective transformation, or light source process are performed, and vertex data of the vertices forming the object is changed (updated or adjusted) based on the process results. Rasterization (scan conversion) is performed based on the vertex data after the vertex process, whereby the surface of the polygon (primitive) is associated with pixels. A pixel process (fragment process) is then performed which draws pixels forming an image (fragments forming a display screen). In the pixel process, the final pixel drawing color is determined by performing various processes such as texture reading (texture mapping), color data setting/change, translucent blending, and anti-aliasing, and the drawing color of the object subjected to perspective transformation is output to (drawn in) a drawing buffer (buffer which can store image information in pixel units; VRAM or rendering target). Specifically, the pixel process involves a per-pixel process which sets or changes the image information (e.g. color, normal, luminance, and alpha value) in pixel units. This causes an image viewed from the virtual camera (given view point) set in the object space to be generated. When two or more virtual cameras (viewpoints) exist, the image may be generated so that images viewed from the respective virtual cameras can be displayed on one screen as divided images.

The vertex process and the pixel process performed by the drawing section 130 may be implemented by hardware which enables a programmable polygon (primitive) drawing process (i.e. programmable shader (vertex shader and pixel shader)) according to a shader program created using shading language. The programmable shader enables a programmable per-vertex process and per-pixel process to increase the degrees of freedom of the drawing process, thereby significantly improving the representation capability in comparison with a fixed drawing process using hardware.

The drawing section 130 performs a geometric process, texture mapping, hidden surface removal, alpha blending, and the like when drawing the object.

In the geometric process, the object is subjected to coordinate transformation, clipping, perspective projection transformation, light source calculation, and the like. The object data (e.g. object's vertex position coordinates, texture coordinates, color data (luminance data), normal vector, or alpha value) after the geometric process (after perspective transformation) is stored in the storage section 170.

Texture mapping is a process for mapping a texture (texel value) stored in a texture storage section onto the object. In more detail, the drawing section 130 reads a texture (surface properties such as color (RGB) and alpha value) from a texture storage section of the storage section 170 using the texture coordinates set (assigned) to the vertices of the object and the like. The drawing section 130 maps the texture (two-dimensional image) onto the object. In this case, the drawing section 130 performs a process of associating the pixels with the texels, bilinear interpolation (texel interpolation), and the like.

In this embodiment, the drawing section may map a given texture when drawing the object. This allows the color distribution (texel pattern) of the texture mapped onto each object to be dynamically changed.

In this case, textures with different color distributions may be dynamically generated, or textures with different color distributions may be provided in advance and the texture used may be dynamically changed. The color distribution of the texture may be changed in object units, or the color distribution of the texture may be changed in object units.

The drawing section may perform hidden surface removal by a Z buffer method (depth comparison method or Z test) using a Z buffer (depth buffer) in which the Z value (depth information) of the drawing pixel is stored. Specifically, the drawing section 130 refers to the Z value stored in a Z buffer 176 when drawing the drawing pixel corresponding to the primitive of the object. The drawing section 130 compares the Z value stored in the Z buffer 176 with the Z value of the drawing pixel of the primitive. When the Z value of the drawing pixel is a Z value in front when viewed from the virtual camera (e.g. small Z value), the drawing section 130 draws the drawing pixel and updates the Z value stored in the Z buffer with a new Z value.

Alpha blending refers to translucent blending (e.g. normal alpha blending, additive alpha blending, or subtractive alpha blending) based on the alpha value (A value). In normal alpha blending, the drawing section 130 calculates a color in which two colors are blended by performing linear interpolation using the alpha value as the degree of blending.

$RQ=(1-\alpha)\times R1+\alpha\times R2$ $GQ=(1-\alpha)\times G1+\alpha\times G2$ $BQ=(1-\alpha)\times B1+\alpha\times B2$ When the blending process is additive alpha blending, the drawing section 120 performs an alpha blending process according to the following expressions.

$RQ=R1+\alpha\times R2$ $GQ=G1+\alpha\times G2$ $BQ=B1+\alpha\times B2$

When the blending process is multiplicative alpha blending, the drawing section 120 performs an alpha blending process according to the following expressions.

$RQ=\alpha\times R1$ $GQ=\alpha\times G1$ $BQ=\alpha\times B1$

When the blending process is multiplicative-additive alpha blending, the drawing section 120 performs an alpha blending process according to the following expressions.

$RQ=\alpha\times R1+R2$ $GQ=\alpha\times G1+G2$ $BQ=\alpha\times B1+B2$

R1, G1, and B1 are R, G, and B components of the color (brightness) of the image (background image) drawn in a drawing buffer 172, and R2, G2, and B2 are R, G, and B components of the color of the object (primitive) to be drawn in the drawing buffer 172. RQ, GQ, and BQ are R, G, and B components of the color of the image obtained by alpha blending.

The alpha value is information which can be stored while being associated with each pixel (texel or dot), such as additional information other than the color information indicating the luminance of each of the R, G, and B color components. The alpha value may be used as mask information, translucency (equivalent to transparency or opacity), bump information, or the like.

The sound generation section 140 processes sound based on the results of various processes performed by the processing section 100, generates game sound such as background music (BGM), effect sound, or voice, and outputs the game sound to the sound output section 192.

The image generation system according to this embodiment may be configured as a system dedicated to a single-player mode in which only one player can play a game, or a system which is also provided with a multiplayer mode in which a number of players can play a game. When a number of players play a game, game images and game sound provided to the players may be generated using one terminal, or may be generated by distributed processing using two or more terminals (game devices or portable telephones) connected through a network (transmission line or communication line), for example.

2. Method According to this Embodiment

2-1. Operation Section

Figure 2:
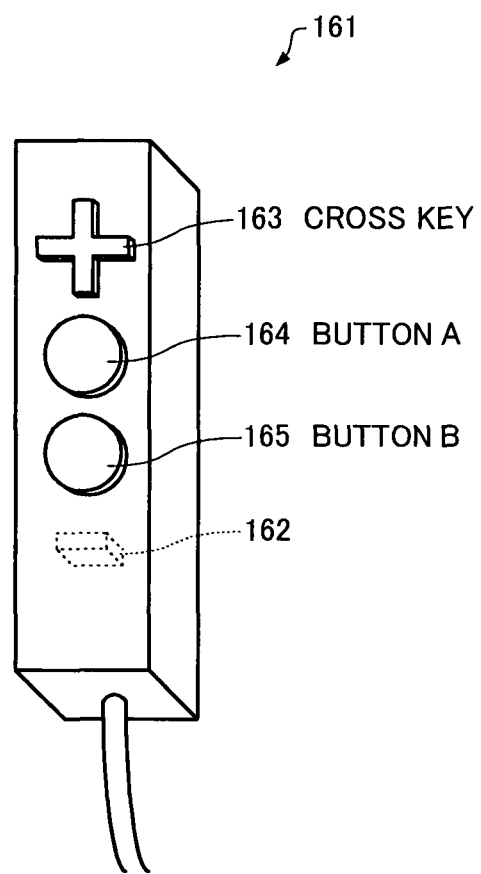
FIG. 2 is a view showing an example of an operation section according to one embodiment of the invention.

FIG. 2 is a view showing an example of the operation section according to this embodiment.

A controller 161 according to this embodiment includes the acceleration sensor 162. The acceleration sensor 162 detects the acceleration vector of the controller.

The controller 161 also includes a cross key 163, a button A 164, a button B 165, and the like.

The acceleration sensor 162 detects the acceleration corresponding to the operation, and outputs the detected acceleration information (output value). The acceleration sensor 162 may be implemented by piezoelectric type, electrodynamic type, or strain gauge type hardware, for example.

The information obtained by the acceleration sensor 162 according to this embodiment indicates the acceleration vectors with respect to three axes (X axis, Y axis, and Z axis) in the world coordinate system.

FIGS. 3A and 3B are views illustrative of an operation input example of shaking the controller.

In this embodiment, it is determined that a shaking input has been performed when a change in acceleration due to the movement of the controller has occurred for a predetermined period of time or longer, and a process corresponding to the shaking input is performed.

For example, when the player has shaken the controller as shown in FIG. 3A, it is recognized that the controller has been vertically shaken (vertical shaking) based on the output value from the acceleration sensor. For example, when the player has shaken the controller as shown in FIG. 3B, it is recognized that the controller has been laterally shaken (lateral shaking) based on the output value from the acceleration sensor.

2-2. Pitching Movement and Operation Input

A game process is described below taking a baseball game as an example in which a game character makes a predetermined movement (pitching) for a ball (given object) to cause the ball (given object) to move in the object space based on the operation input from the controller (operation section) including the acceleration sensor.

Figure 4:
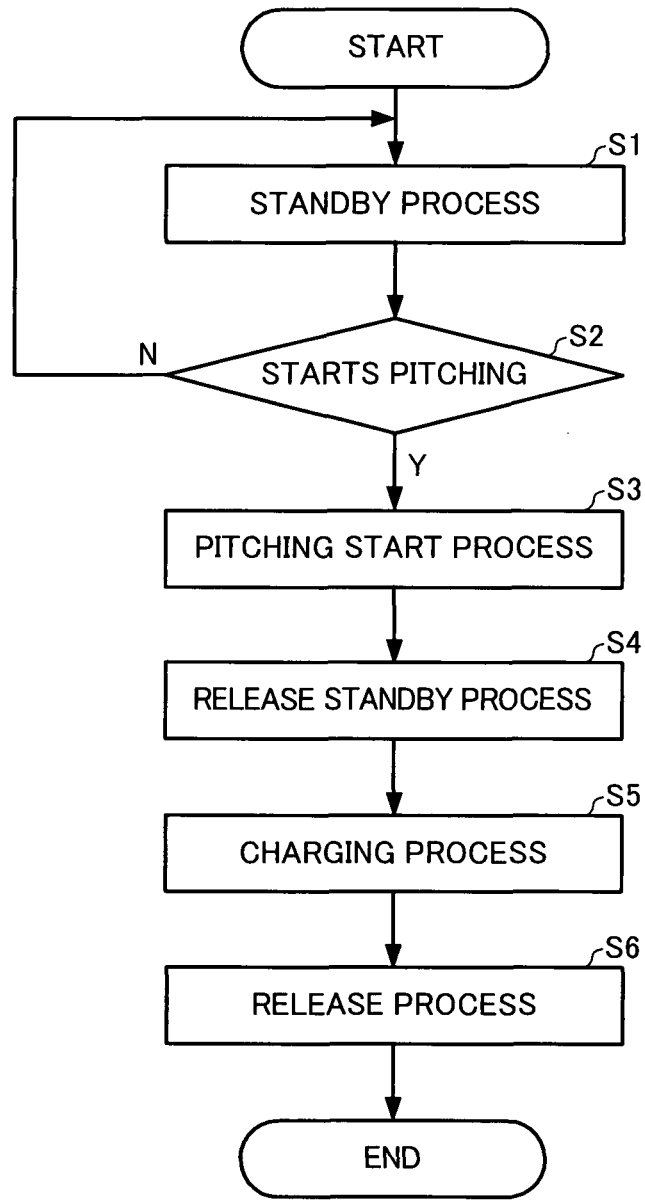
FIG. 4 is a flowchart showing the flow of a baseball game pitching process.

FIG. 4 is a flowchart showing the flow of a baseball game pitching process according to this embodiment. FIGS. 5A to 5D are views illustrative of the pitching movement of the game character according to this embodiment.

A standby process is performed (step S1).

Figure 5A:
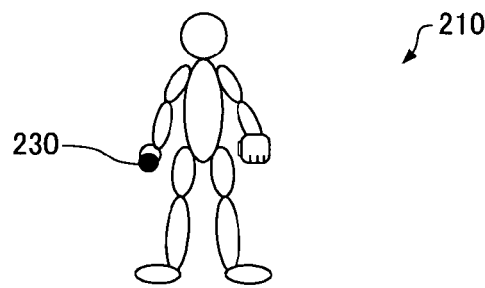
FIGS. 5A to 5D are views illustrative of a pitching movement of a game character according to one embodiment of the invention.

FIG. 5A shows the game character in a pitching standby state on the mound. A reference numeral 230 indicates a ball (given object) for which a game character 230 makes a predetermined movement (pitching).

When a runner is on base in the standby state, the game character may make a pickoff throw when the player has pressed the button A.

When the player has shaken the controller vertically (see FIG. 3A) or laterally (see FIG. 3B) in the standby state, the game character may make an action provided for vertical shaking or an action provided for lateral shaking.

When the player has performed a pitching start input (step S2), a pitching start process is performed (step S3).

Figure 5B:
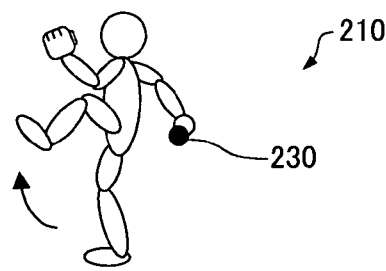

FIG. 5B shows the game character in a pitching start state. When the player has performed the pitching start input in the standby state, the game character 210 starts a pitching motion.

For example, the player may determine the type of pitch using the button in the standby state, and the pitch determination input may be used as the pitching start input. In this embodiment, the type of pitch such as a fastball, a change-up, a left curve ball, a right curve ball, or a special ball can be selected using the cross key, the button A, and the button B.

A release standby process is performed (step S4).

A charging process is then performed (step S5).

Figure 5C:
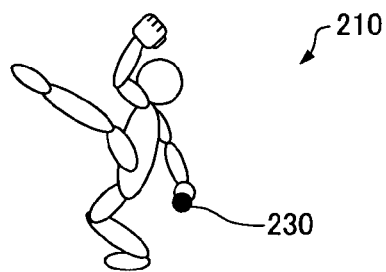

FIG. 5C shows the game character 210 in a charging state. The term "charging" means storing a power value which is a game parameter used when controlling the power, the accuracy, the movement state, the movement result, and the like when the game character pitches. In this embodiment, the charging operation can be performed according to instructions from the player between the pitching start state and the release state or in the release standby state (state in which the pitching start motion has been completed but the ball has not been released).

The charging input may be realized using a configuration (configuration A) in which the player performs the charging input by shaking the controller within a predetermined period, for example. In the configuration A, a period may be set in which the player can perform the charging input, and the charging input is accepted only in the set period. In the configuration A, the charging input may be detected by only the shaking operation of the controller (without combining with another operation input such as button input) based on the output acceleration value. For example, the player may perform the charging input by vertically shaking the controller (see FIG. 3A) for a predetermined period of time or longer in the pitching motion period.

A configuration (configuration B) may be employed in which the player performs the charging input by combining the shaking operation of the controller and another operation input such as a button input. For example, the player may perform the charging input by vertically shaking the controller (see FIG. 3A) for a predetermined period of time or longer while pressing the button.

A configuration (configuration C) may be employed in which the player performs the charging input by combining the shaking operation of the controller in a predetermined posture and another operation input such as a button input. For example, the player may perform the charging input by holding the controller in a predetermined posture (predetermined inclination) shaking for a predetermined period of time or longer after the pitching motion has commenced.

A release process is then performed (step S6).

Figure 5D:
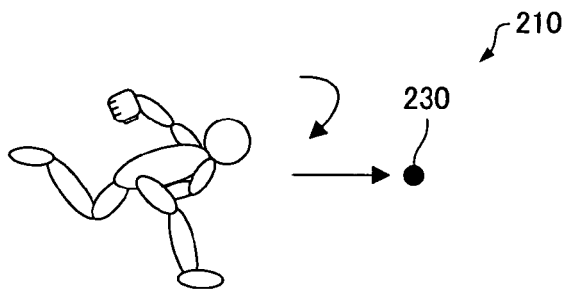

FIG. 5D shows the game character 210 in a release state. In this embodiment, the charging state or the release standby state transitions to the release state in response to instructions from the player or automatically. For example, the player may issue release instructions by shaking the controller, or may issue release instructions by shaking the controller while releasing the button. The charging state or the release standby state may automatically transition to the release state when a predetermined period of time has elapsed after the pitching motion has commenced.

The ball 230 is separated from the game character and moves in the object space upon transition to the release state.

2-3. Process During Charging-to-release Movement (Configuration A)

FIG. 6 is a flowchart showing an example of the flow of the process during the charging-to-release movement (configuration A).

The following process is performed in the pitching motion period (step S10).

In the case where the pitching motion is performed when the player has pressed a pitching start button, a predetermined period of time after the pitching start button has been pressed may be determined to be the pitching motion period.

The game character is caused to make the pitching start motion (step S20). The term "pitching start motion" refers to the movement of the game character when the game character in the standby state shown in FIG. 5A winds up as shown in FIG. 5B.

The charging input is detected based on the detected acceleration value (step S30). It may be determined that the controller is vertically shaken when the detected acceleration value is equal to or greater than a predetermined value for a predetermined period of time to determine that the charging input has been performed.

When the charging input has been detected (step S40), the duration of the charging input is measured (step S50).

When the completion of the charging input or the expiration of the pitching start motion period has been detected (step S60), the game character is caused to make the release standby motion (step S70). The term "release standby motion" refers to the movement of the game character when the game character which has wound up prepares for release.

When the release input has occurred (step S80), the game character is caused to make the release motion (step S90). The term "release motion" refers to the movement of the game character when the game character pitches the ball as shown in FIG. 5D, for example. It may be determined that the release input has occurred when the shaking input has occurred during the release standby motion.

The power value (game parameter) is set based on the duration of the charging input, and the movement state and the movement result of the given ball object are controlled based on the power value (step S100). For example, the velocity of the pitched ball, the probability that the ball enters the strike zone, and the like may be controlled.

2-4. Process During Charging-to-Release Movement (Configuration B)

Figure 7:
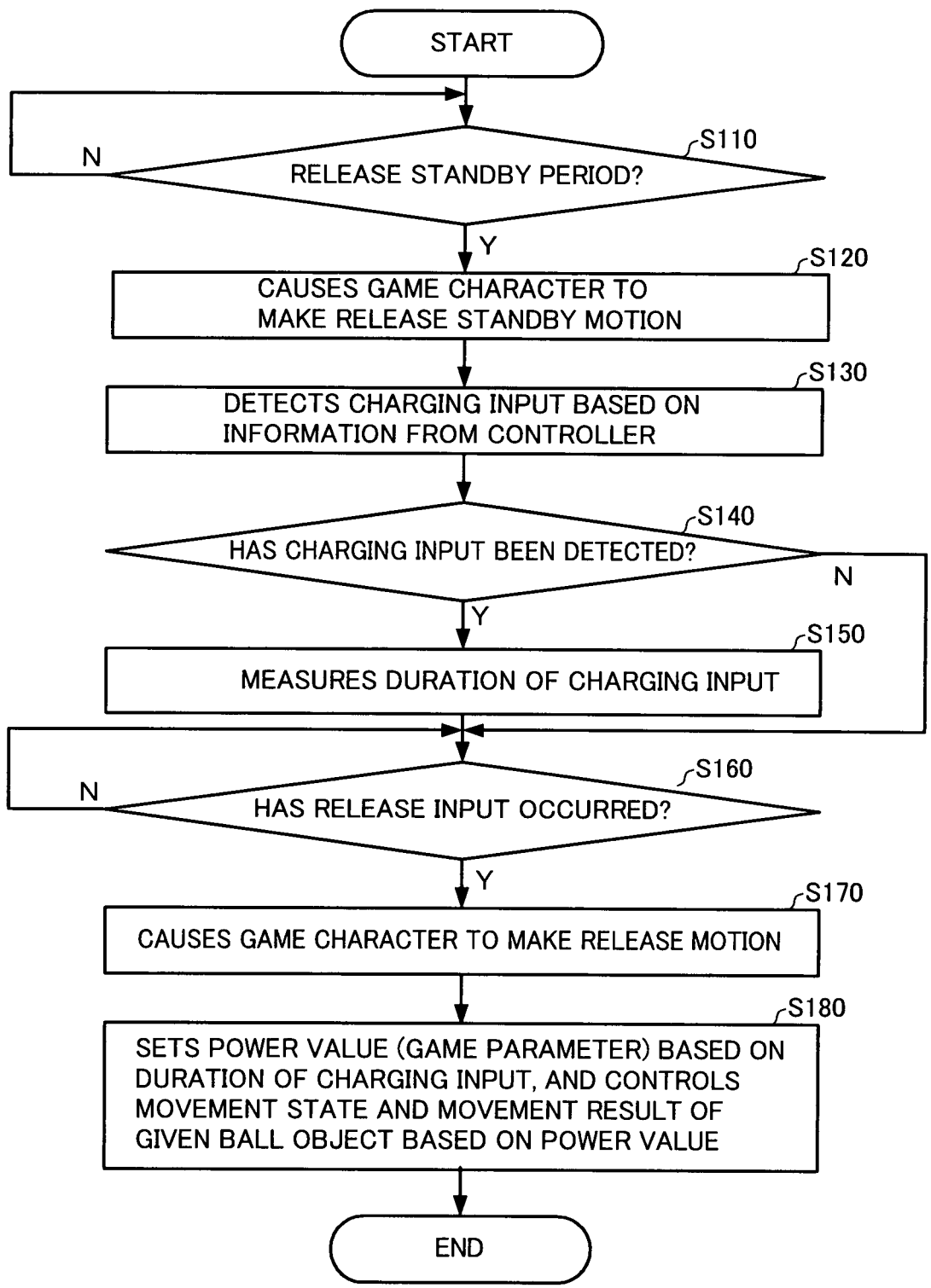
FIG. 7 is a flowchart showing an example of the flow of a process during a charging-to-release movement (configuration B).

FIG. 7 is a flowchart showing an example of the flow of the process during the charging-to-release movement (configuration B).

The following process is performed in the release standby period (step S110).

The game character is caused to make the release standby motion (step S120). The term "release standby motion" refers to the movement of the game character when the game character which has wound up prepares for release.

The charging input is detected based on the information from the controller (detected acceleration value and input signal using button) (step S130).

It may be determined that the controller is vertically shaken with the button pressed when a button press signal is input and the detected acceleration value is equal to or greater than a predetermined value for a predetermined period of time to determine that the charging input has been performed.

When the charging input has been detected (step S140), the duration of the charging input is measured (step S150).

When the release input has occurred (step S160), the game character is caused to make the release motion (step S170). The term "release motion" refers to the movement of the game character when the game character pitches the ball as shown in FIG. 5D, for example. It may be determined that the release input has occurred when the shaking input has occurred with the button released.

The power value (game parameter) is set based on the duration of the charging input, and the movement state and the movement result of the given ball object are controlled based on the power value (step S180). For example, the velocity of the pitched ball, the probability that the ball enters the strike zone, and the like may be controlled.

2-5. Process During Charging-to-Release Movement (Configuration C)

Figure 8:
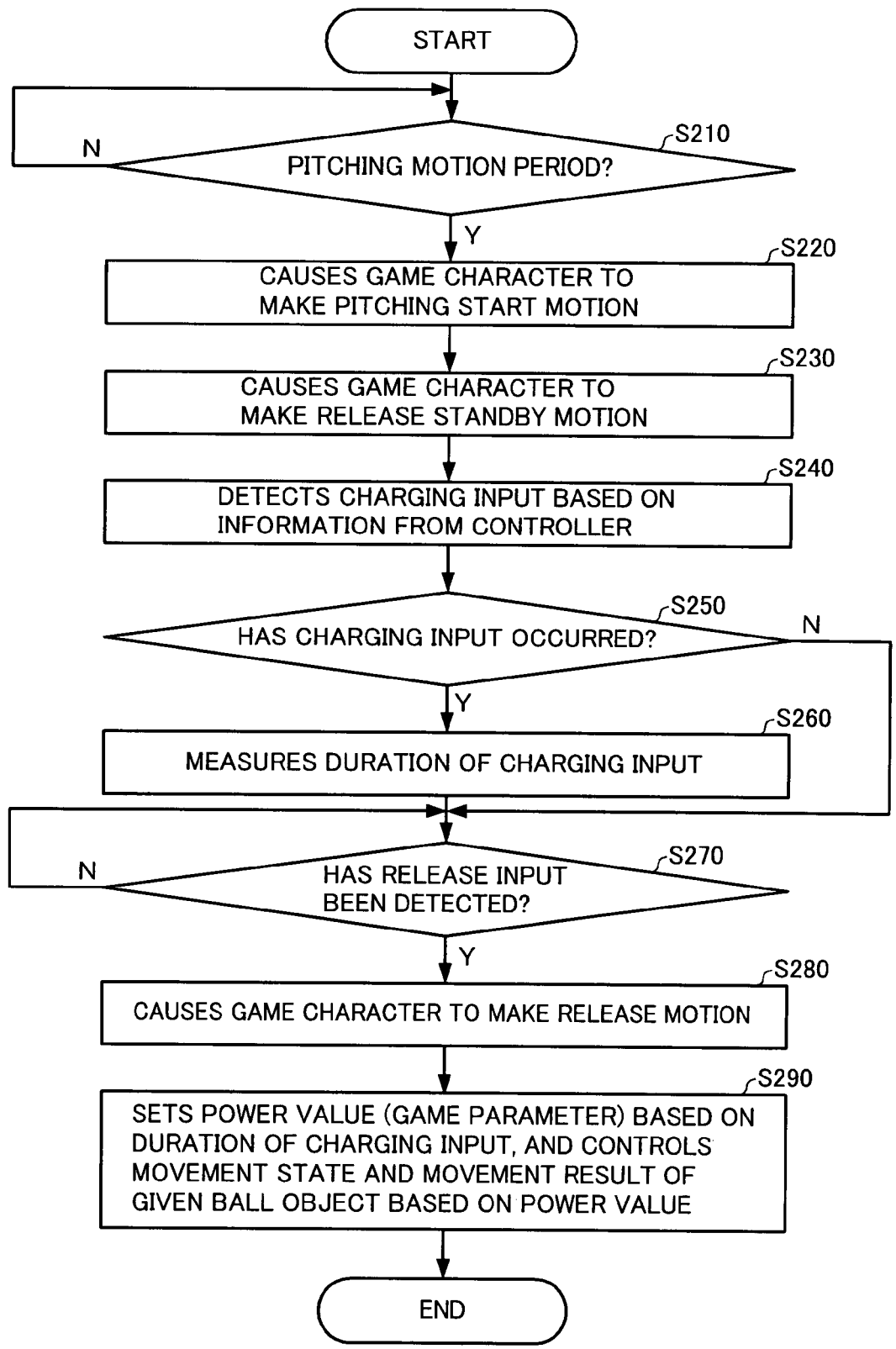
FIG. 8 is a flowchart showing an example of the flow of a process during a charging-to-release movement (configuration C).

FIG. 8 is a flowchart showing an example of the flow of the process during the charging-to-release movement (configuration C).

The following process is performed in the pitching motion period (step S210).

In the case where the pitching motion is performed when the player has pressed the pitching start button, a predetermined period of time after the pitching start button has been pressed may be determined to be the pitching motion period.

The game character is caused to make the pitching start motion (step S220). The term "pitching start motion" refers to the movement of the game character when the game character in the standby state shown in FIG. 5A winds up as shown in FIG. 5B.

The game character is caused to make the release standby motion (step S230). The term "release standby motion" refers to the movement of the game character when the game character which has wound up prepares for release.

The charging input is detected based on the detected acceleration value (step S240). It may be determined that the controller is held in a predetermined posture for indicating the charging input when the detected acceleration value indicates a predetermined orientation for a predetermined period of time (determined based on the value set according to the posture of the controller during charging) to determine that the charging input has been performed.

When the charging input has been detected (step S250), the duration of the charging input is measured (step S260).

When the release input has been detected (step S270), the game character is caused to make the release motion (step S280). The term "release motion" refers to the movement of the game character when the game character pitches the ball as shown in FIG. 5D, for example. It may be determined that the release input has occurred when the shaking input has occurred with the button released.

The power value (game parameter) is set based on the duration of the charging input, and the movement state and the movement result of the given ball object are controlled based on the power value (step S290). For example, the velocity of the pitched ball, the probability that the ball enters the strike zone, and the like may be controlled.

2-6. Process During Combined Movement Based on First Operation Input (Charging Input) and Second Operation Input (e.g. Pitch, Hit, or Kick)

Figure 9:
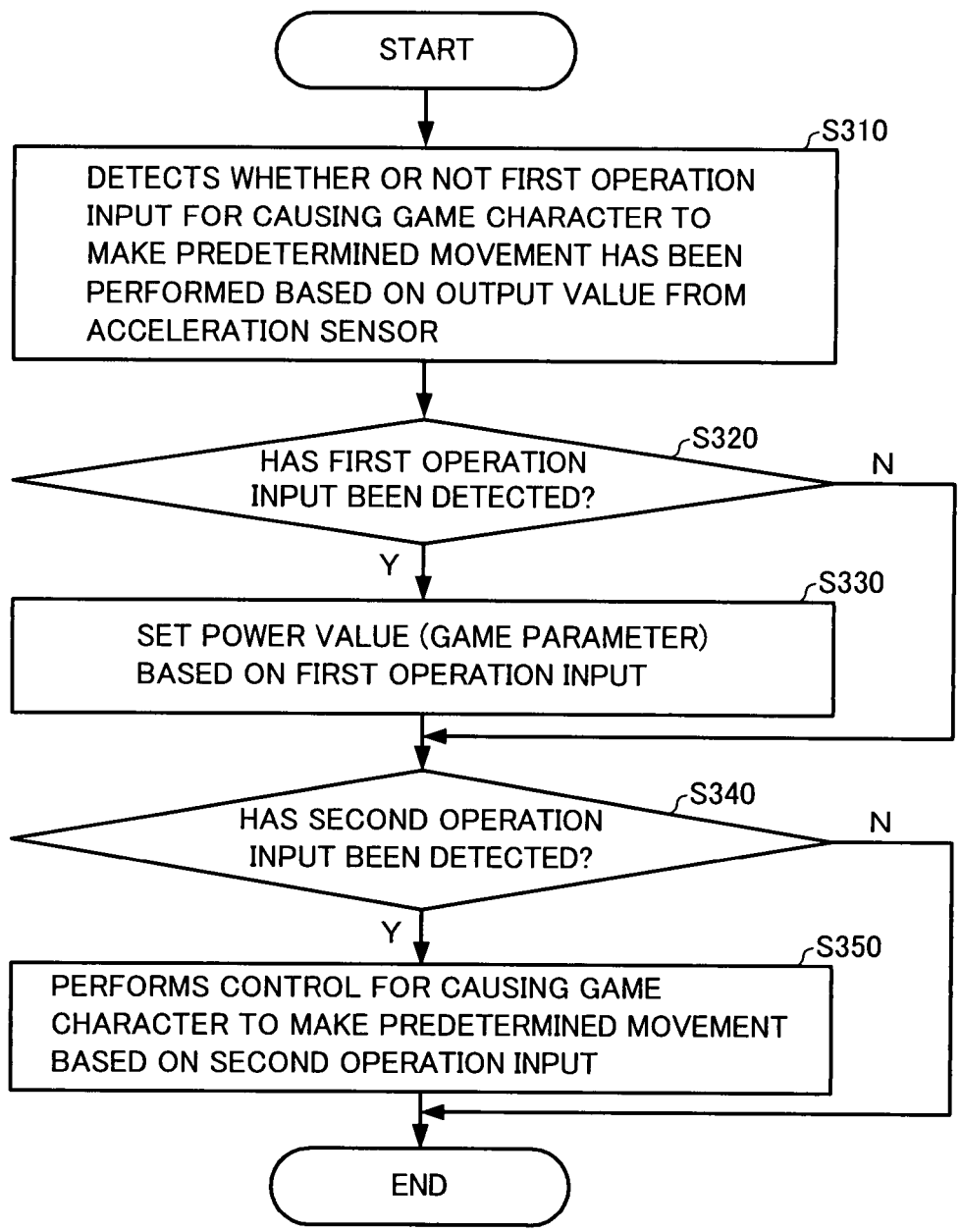
FIG. 9 is a flowchart showing an example of the flow of a process during a combined movement based on a first operation input (charging input) and a second operation input (e.g. pitch, hit, or kick).

FIG. 9 is a flowchart showing an example of the flow of the process during the combined movement based on the first operation input (charging input) and the second operation input (e.g. pitch, hit, or kick).

Whether or not the first operation input (charging input) for causing the game character to make a predetermined movement has been performed is detected based on the output value from the acceleration sensor (step S310).

When the first operation input (charging input) has been detected (step S320), the power value (game parameter) is set based on the first operation input (step S330).

When the second operation input (operation input corresponding to a pitch, hit, or kick or the like) has been detected (step S340), the game character is caused to make a predetermined movement based on the second operation input (step S340).

2-7. Process of Setting Moving Path of Ball by Release Motion

Figure 10:
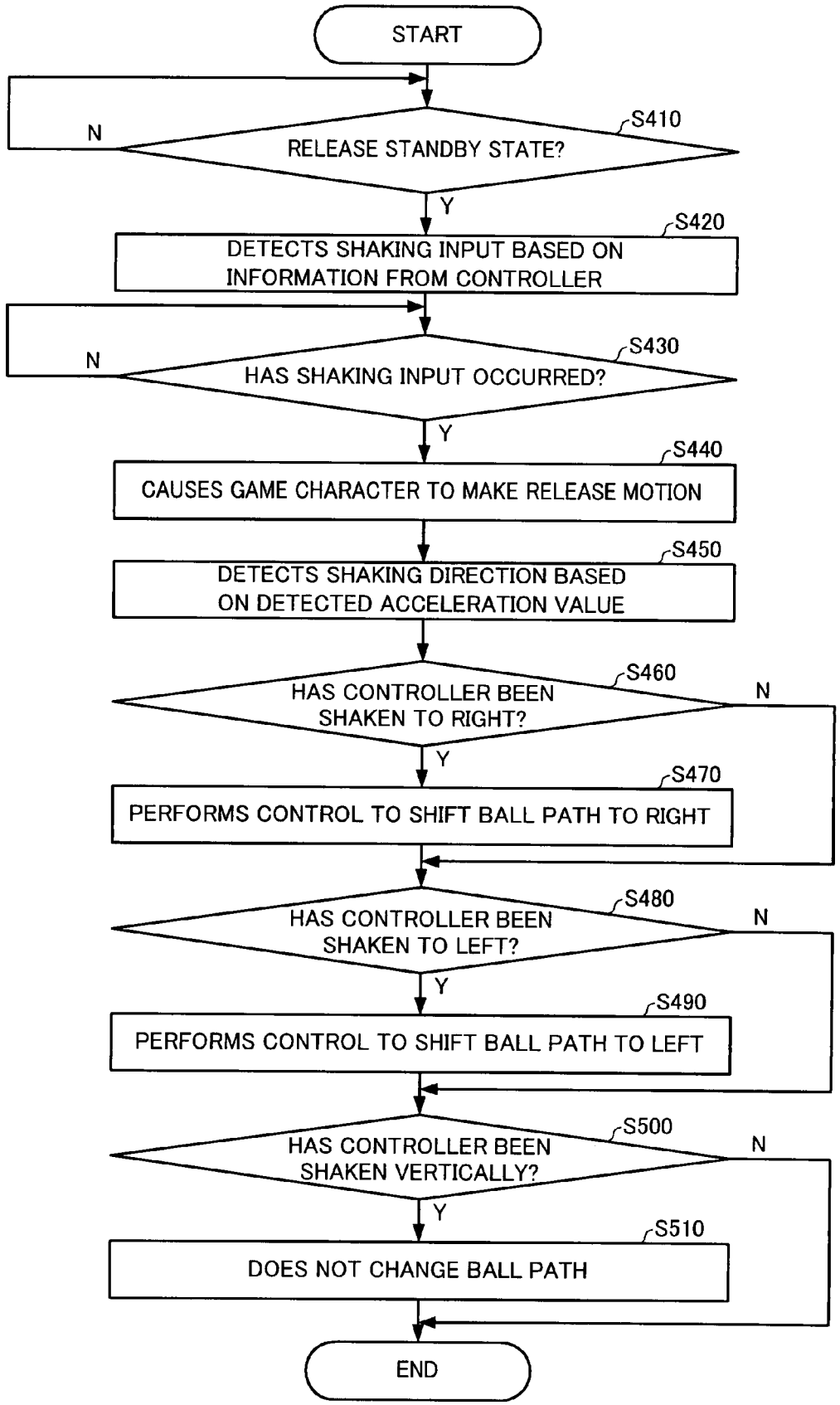
FIG. 10 is a flowchart showing an example of the flow of a process of setting the moving path of a ball by a release motion.
Figure 11A:
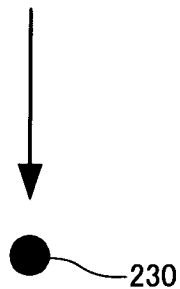
FIGS. 11A to 11C are views showing the moving path of a ball after being released.
Figure 11B:
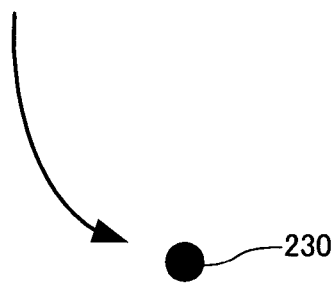
Figure 11C:
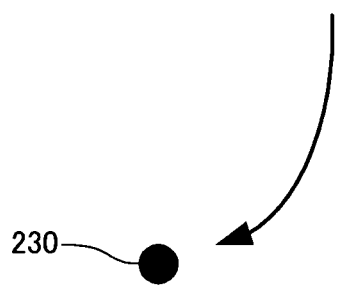

FIG. 10 is a flowchart showing an example of the flow of the process of setting the moving path of the ball by the release motion. FIGS. 11A to 11C are views showing the moving path of the ball after being released.

The following process is performed in the release standby state (step S410).

The shaking input is detected based on the information from the controller (e.g. detected acceleration value) (step S420).

When the shaking input has been detected (step S430), the game character is caused to make the release motion (step S440).

The shaking direction is detected based on the detected acceleration value (step S450).

When the controller has been shaken to the right (step S460), the path of the ball is shifted to the right (step S470). For example, the path of the ball may be shifted to the right by selecting a ball path calculation expression or parameter for shifting the path to the right. This allows the ball 230 to curve to the right, as shown in FIG. 11B.

When the controller has been shaken to the left (step S480), the path of the ball is shifted to the left (step S490). For example, the path of the ball may be shifted to the left by selecting a ball path calculation expression or parameter for shifting the path to the left. This allows the ball 230 to curve to the left, as shown in FIG. 11C.

When the controller has been vertically shaken (step S500), the path of the ball is not changed (step S510). For example, the path of the ball may be straightened by selecting a ball path calculation expression or parameter for a straight ball path. This allows the ball 230 to move linearly, as shown in FIG. 11A.

2-8. Process of Setting Moving Path of Ball Based on Second Operation Input During Combined Movement Based on First Operation Input (Operation Input Corresponding to Pitch, Kick, Hit, Beat, or the Like) and Second Operation Input (Direction Instruction Input)

When performing a game process in which the game character makes a predetermined movement (e.g. pitch, kick, hit, or beat) for a given object to cause the given object to move in the object space based on the operation input from the operation section including the acceleration sensor, the first operation input (operation input corresponding to pitch, kick, hit, beat, or the like) and the second operation input (direction instruction input) for causing the game character to make a predetermined movement have been performed may be detected based on the output value from the acceleration sensor, the game character may be caused to make a predetermined movement based on the first operation input, and the movement state of the given object may be controlled based on the second operation input.

Figure 12:
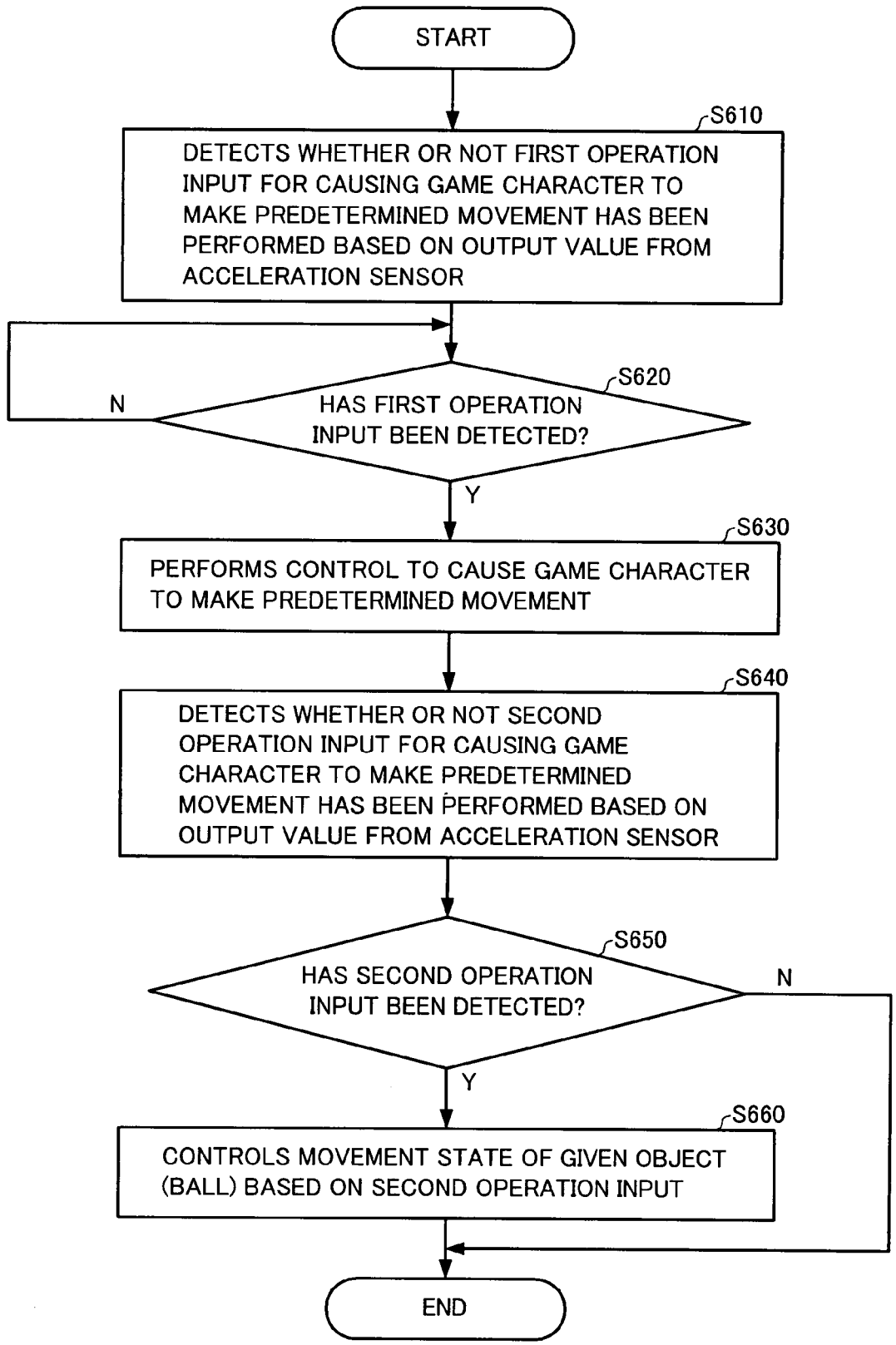
FIG. 12 is a flowchart showing an example of the flow of a process of setting the moving path of a ball based on a second operation input during a combined movement based on a first operation input and a second operation input.

FIG. 12 is a flowchart showing an example of the flow of the process of setting the moving path of the ball based on the second operation input during the combined movement based on the first operation input (operation input corresponding to a pitch, kick, hit, beat, or the like) and the second operation input (direction instruction input).

Whether or not the first operation input for causing the game character to make a predetermined movement has been performed is detected based on the output value from the acceleration sensor (step S610).

When the first operation input (pitch) has been detected (step S620), the game character is caused to make a predetermined movement (pitch) (step S630).

Whether or not the second operation input for causing the game character to make a predetermined movement has been performed is detected based on the output value from the acceleration sensor (step S640).

When the second operation input has been detected (step S650), the movement state of the given object (ball) is controlled based on the second operation input (step S660).

2-9. Game Image Mode Display Object

FIGS. 13A to 13D show an example of a mode display object according to this embodiment.

Figure 13C:
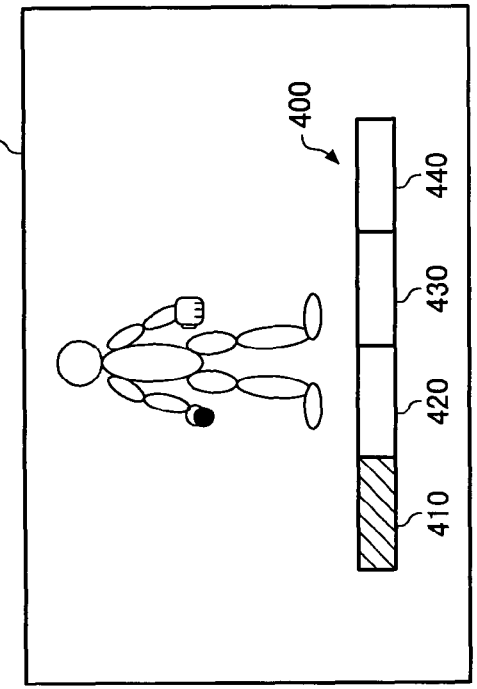
FIGS. 13A to 13D show an example of a mode display object according to one embodiment of the invention.
Figure 13D:
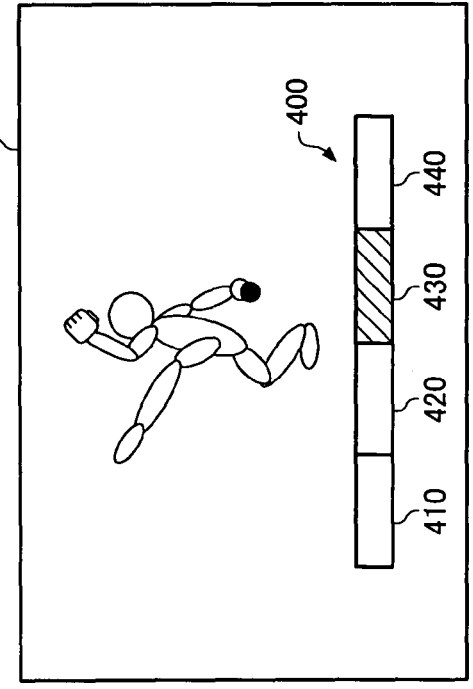
Figure 13A:
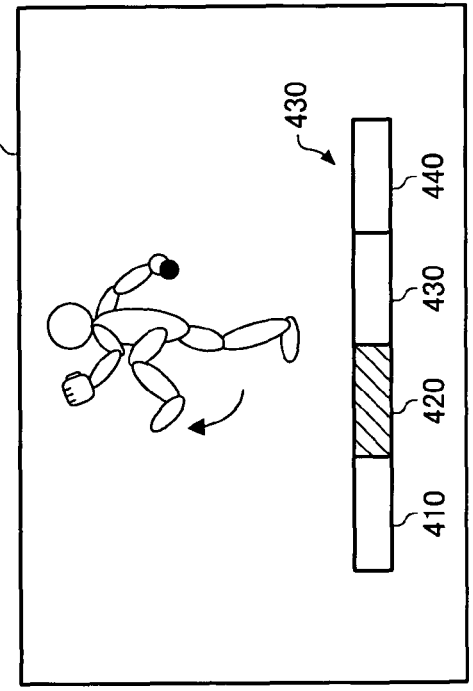
Figure 13B:
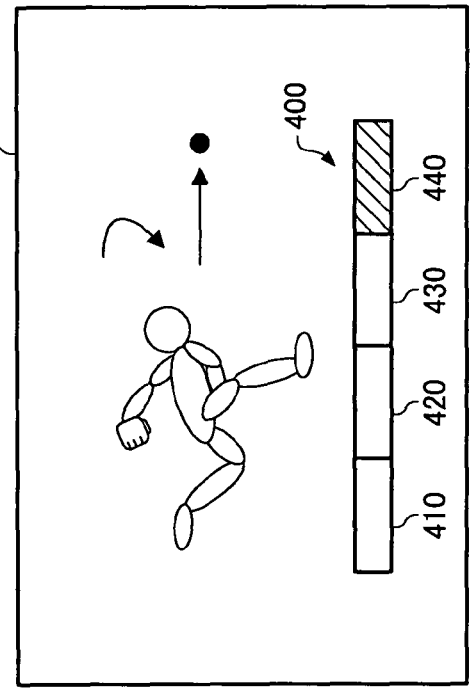

FIG. 13A (350-1) shows a game image when the game character is in the standby state (standby mode), FIG. 13B (350-2) shows a game image when the game character is in the pitching start state (pitching start mode), FIG. 13C (350-3) shows a game image when the game character is in the charging state (charging mode), and FIG. 13D (350-4) shows a game image when the game character is in the release state (release mode).

A mode display object 300 is an object indicating whether the present state of the game character is the standby mode, the pitching start mode, the charging mode, or the release mode.

When a standby mode display 310 is ON (FIG. 13A), the game character is in the standby mode. When a pitching start mode display 320 is ON (FIG. 13B), the game character is in the pitching start mode. When a charging mode display 330 is ON (FIG. 13C), the game character is in the charging mode. When a release mode display 340 is ON (FIG. 13D), the game character is in the release mode. This allows the player to determine the present mode and the present state of the game character.

Figure 14B:
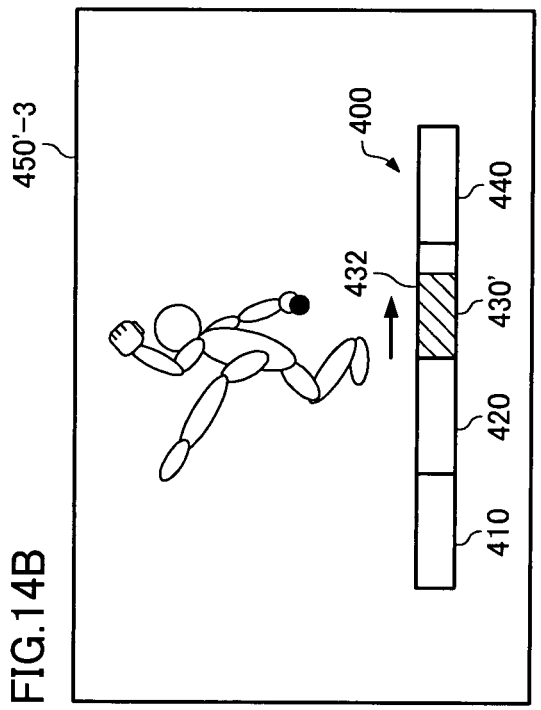
FIGS. 14A and 14B show another example of the mode display object according to one embodiment of the invention.
Figure 14A:
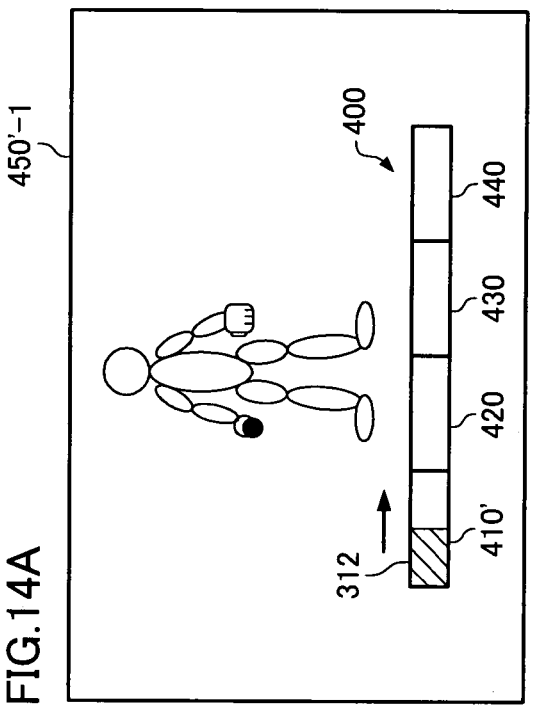

FIGS. 14A and 14B show another example of the mode display object according to this embodiment.

For example, when the upper limit (maximum value) is set for the standby or charging period and the state automatically transitions to the next state when the period has expired, gauges 312 and 332 may be moved with the passage of time, as indicated by a standby mode display 310' in FIG. 14A and a charging mode display 330' in FIG. 14B. Therefore, the player can immediately determine the remaining standby period and the remaining charging period using the mode display object.

2-10. Detection Method of Shaking Input of Controller

An example is described below in which the acceleration value of each of three axes (X axis, Y axis, and Z axis) is detected using the acceleration sensor, and the shaking input of the controller is detected based on the acceleration values of the three axes.

Figure 15A:
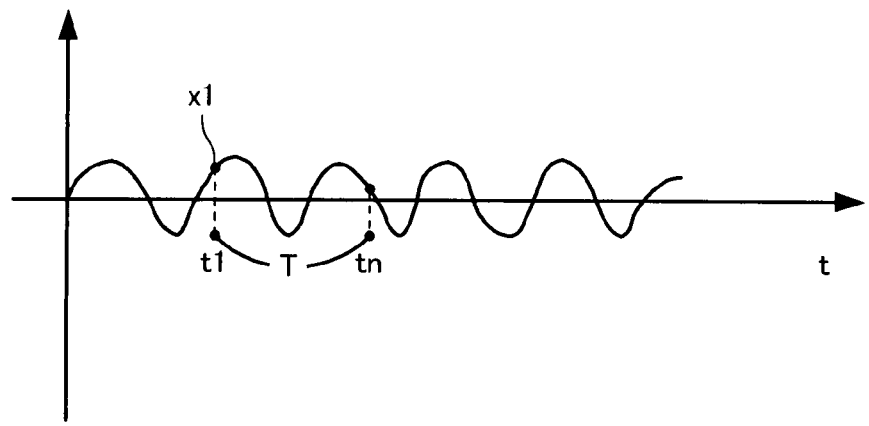
FIGS. 15A to 15C are graphs showing changes in acceleration values (i.e. output values from acceleration sensor) of the X axis, the Y axis, and the Z axis, respectively.
Figure 15B:
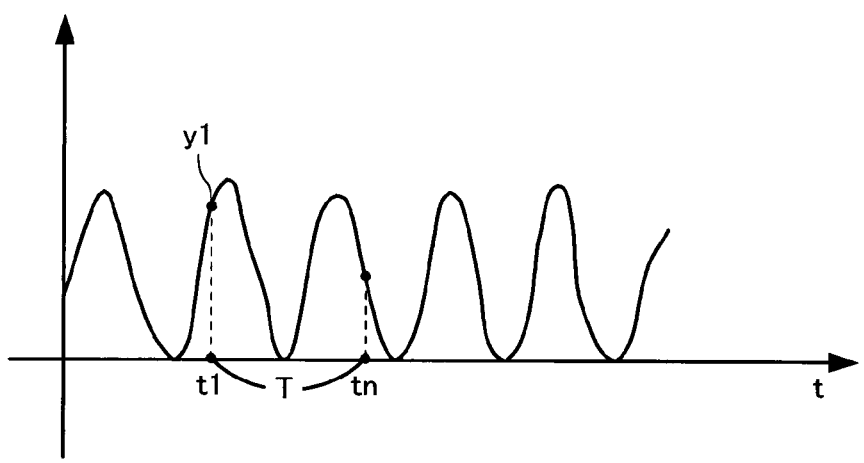
Figure 15C:
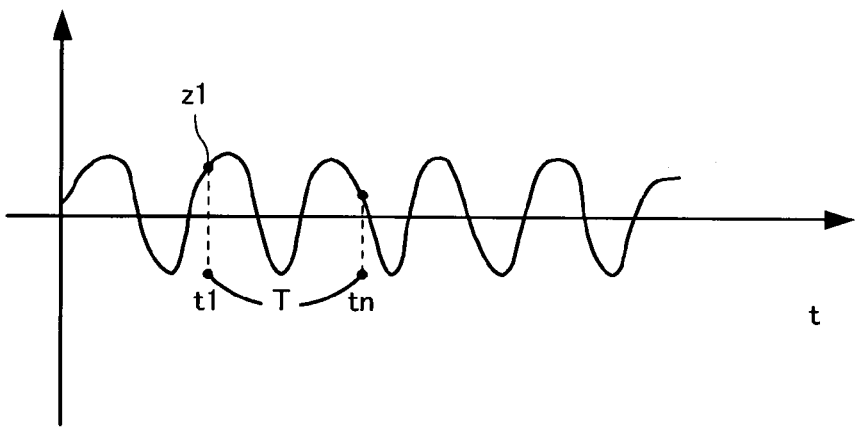

FIGS. 15A to 15C are graphs showing changes in acceleration values (i.e. output values from acceleration sensor) of the X axis, the Y axis, and the Z axis, respectively.

In this embodiment, whether or not the controller is shaken may be determined by determining whether or not the acceleration value becomes equal to or greater than a predetermined value in a predetermined period of time T, for example.

The acceleration value may be determined based on the acceleration of each of the X axis, the Y axis, and the Z axis at a time t. For example, when the acceleration value of the X axis at a time t1 is x1, the acceleration value of the Y axis at the time t1 is y1, and the acceleration value of the Z axis at the time t1 is z1, an acceleration value k1 at the time t may be calculated by the following expression.

$$k_1 = \sqrt{x_1^2 + y_1^2 + z_1^2}$$

Whether or not the acceleration value has become equal to or greater than a predetermined value in the period T may be determined by calculating the average value of the acceleration values in the period T (t1 to tn) and determining whether or not the average value has become equal to or greater than a predetermined value.

For example, when the posture of the controller affects determination as a vibration command condition (e.g. when the charging input is performed by holding the controller in a predetermined posture), an arc tangent (Y/Z) may be obtained based on the acceleration value y of the Y axis and the acceleration value z of the Z axis.

2-11. Reaction Input Recognition Prevention Method

Figure 16:
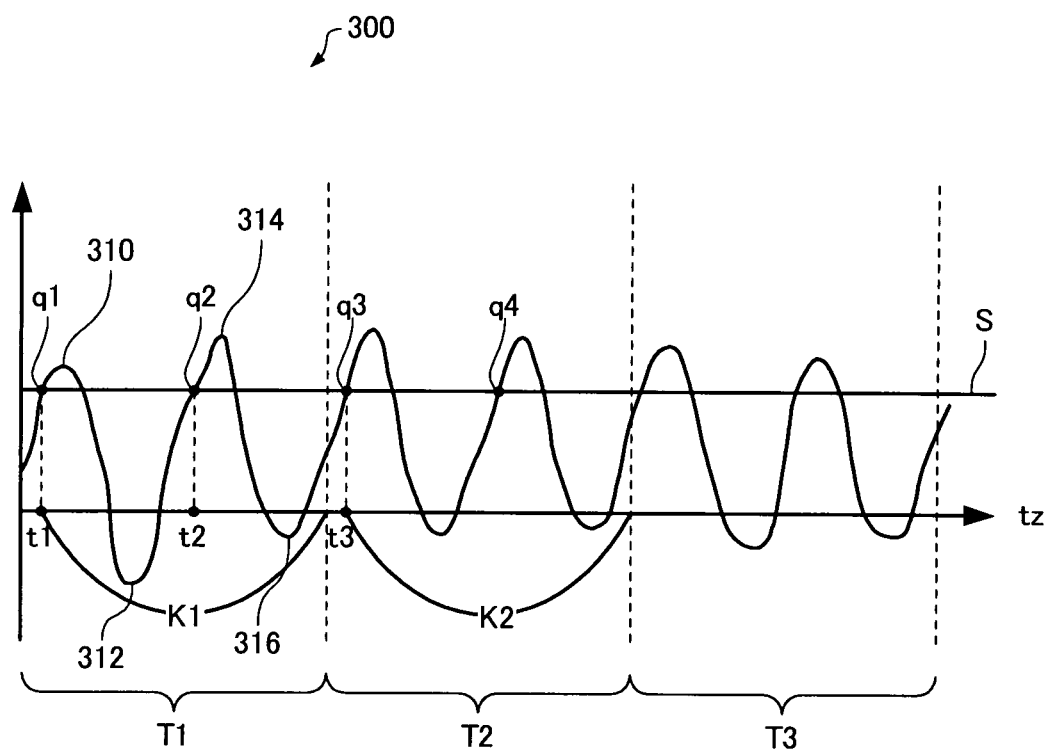
FIG. 16 is a view illustrative of a reaction input recognition prevention method according to one embodiment of the invention.

FIG. 16 is a view illustrative of a reaction input recognition prevention method according to this embodiment. A reference numeral 300 indicates a temporal change in acceleration value detected by the acceleration sensor with respect to a given axis when the user shakes the controller including the acceleration sensor. When the user moves the controller back and forth once in each of periods T1, T2, and T3, four pulses occur in each of the periods T1, T2, and T3. For example, four pulses having the maximum values indicated by 310, 312, 314, and 316 occur in the period T1. The pulses having the maximum values indicated by 314 and 316 are pulses which occur as the reaction inputs of the pulses having the maximum values indicated by 310 and 312.

For example, when detecting that the controller is shaken on condition that the acceleration value is equal to or greater than a predetermined value, a predetermined threshold value S is set, and one vibration command is detected when the detected acceleration value exceeds the threshold value S. Specifically, the vibration command may be detected when an acceleration value q1 exceeds the threshold value S at a time t1 in the period T1.

In this embodiment, the vibration command is not detected for a predetermined period of time after the vibration command has been detected (e.g. for a period k1 after the vibration command has been detected at the time t1). Therefore, the next vibration command is detected at a time t3 at which the first acceleration value detected after the expiration of the predetermined period of time exceeds the threshold value S.

Therefore, the vibration command is not detected at a time t2 although an acceleration value q2 exceeds the threshold value S. One vibration command can be detected corresponding to one shaking operation without detecting the pulse due to the reaction input by setting the period in which the vibration command is not recognized (command recognition prohibition period) based on the four-pulse cycle.

The duration of the period in which the vibration command is not detected may be appropriately set at a value differing from that of the above example. For example, when detecting the command in h second units, h' seconds (h' is appropriately set depending on the transition properties of the acceleration value and the time h) after the command has been detected may be set as the command recognition prohibition period.

2-12. Calibration Adjustment Process

Figure 17:
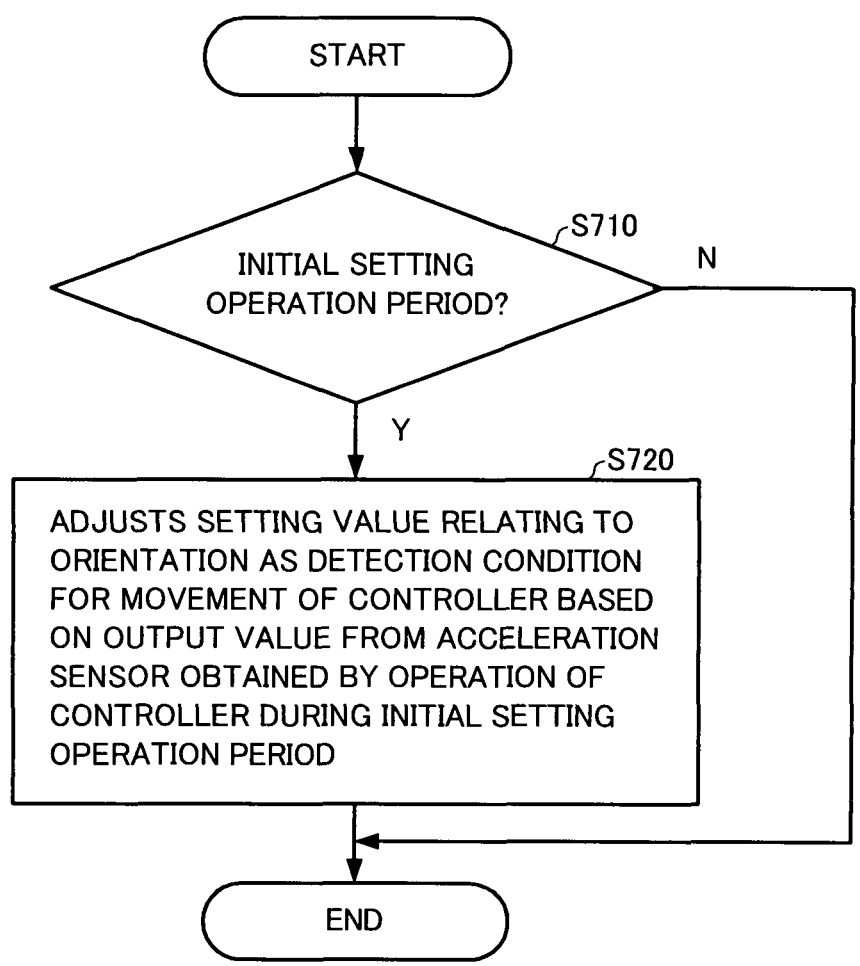
FIG. 17 is a flowchart showing the flow of a calibration adjustment process.

FIG. 17 is a flowchart showing the flow of a calibration adjustment process.

Whether or not the initial setting operation period occurs is determined (step S710). When the initial setting operation period occurs, the setting value relating to orientation as the detection condition for the movement of the controller is adjusted based on the output value from the acceleration sensor obtained by the operation of the controller (step S720).

The initial setting period may be set before starting the game.

The user holds the controller at a reference position in a basic posture in the initial setting period, and the output value from the acceleration sensor is acquired. Even if the reference position and the basic posture are determined in advance and the user holds the controller at the reference position in the basic posture, the inclination and the like of the controller when held differ to some extent depending on the user.

According to this embodiment, when the orientation is used to detect the movement of the controller, the orientation can be determined as an offset from the reference position set for each user, whereby the difference in reference position, which differs to some extent depending on the user, can be absorbed.

For example, the user performs the shape operation in the initial setting period, and the output value from the acceleration sensor is acquired. Since the cycle, velocity, strength, and distance of the shape operation differ depending on the user, a change in the detected acceleration value also differs depending on the user.

According to this embodiment, when the acceleration value is used to detect the movement of the controller, the threshold value when determining the acceleration value may be set corresponding to each user based on the acceleration value detected in the initial setting period.

2-13. Movement Display Object

Figure 18A:
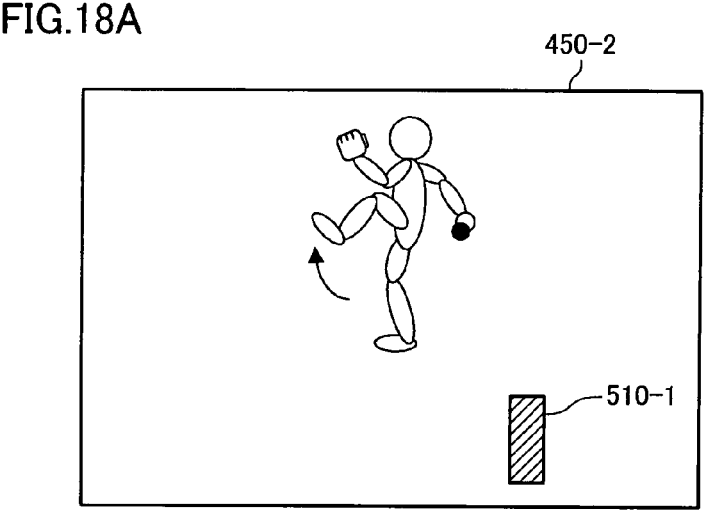
FIGS. 18A to 18C are views illustrative of display control of a movement display object.
Figure 18B:
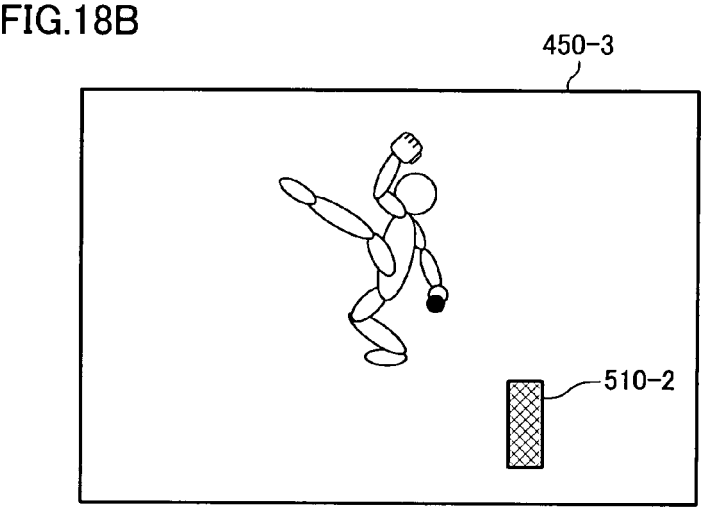
Figure 18C:
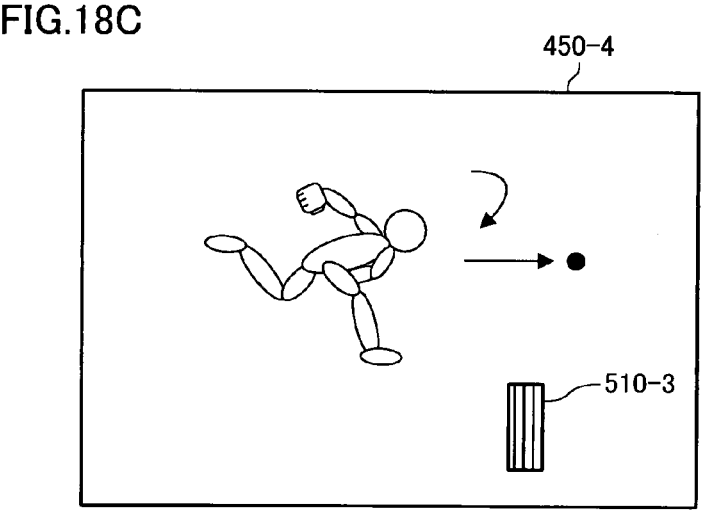

FIGS. 18A to 18C are views illustrative of display control of the movement display object.

The movement display object is an object for displaying information of the movement of the game character performed as a result of detection of the operation input. For example, the game character makes the pitching start movement (first movement) based on the first operation input, makes the charging movement (second movement) based on the second operation input, and makes the release movement (third movement) based on the third operation input.

FIG. 18A shows the game image when the game character makes the pitching start movement. In this case, when the player has performed the first operation input, a movement display object 510-1 is displayed in a color A, for example.

FIG. 18B shows the game image when the game character makes the charging movement. In this case, when the player has performed the second operation input, a movement display object 510-2 is displayed in a color B, for example.

FIG. 18C shows the game image when the game character makes the release movement. In this case, when the player has performed the third operation input, a movement display object 510-3 is displayed in a color C, for example.

The player can play the game while checking whether or not the operation input is accepted by moving the controller on the game screen by changing the state of the movement display object corresponding to the operation input by the player.

The state of the movement display object may be changed by changing the presence or absence of the movement display object, or changing the size and the shape of the movement display object, or causing the movement display object to blink.

2-14. Movement State Display Object

Figure 19A:
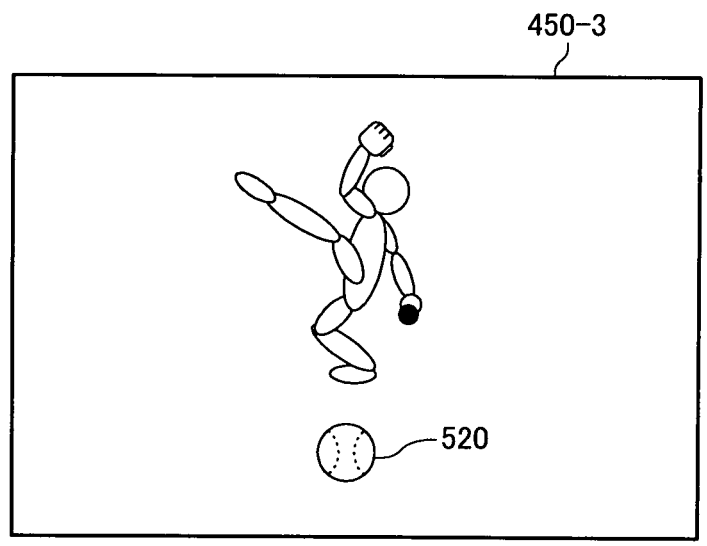
FIGS. 19A and 19B are views illustrative of display control of a movement state display object.
Figure 19B:
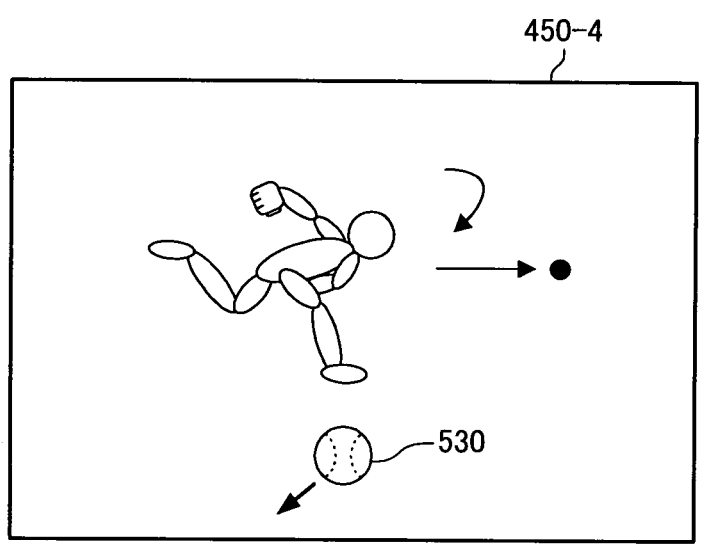

FIGS. 19A and 19B are views illustrative of display control of the movement state display object.

The movement state display object is an object for displaying information about control of the movement state of the object performed as a result of detection of the operation input. For example, the game character makes the charging movement (first movement) based on the first operation input, and makes the release movement (second movement) based on the second operation input. The power value is stored by the charging operation, the state (e.g. velocity and accuracy) of the ball after being released is determined by the power value, and the path (right, left, or straight) of the ball is determined by the shaking operation of the controller during the release movement.

FIG. 19A shows the game image when the game character makes the charging movement. In this case, when the player has performed the first operation input, the size of a movement state display object 520 changes depending on the charging time (e.g. the movement state display object 520 becomes larger as the charging time becomes longer). This allows the player to visually check the state in which the power value is stored by the player's charging operation (operation such as shaking the controller while pressing the button) on the game screen. The player can decide to finish the charging operation when the amount of charging becomes appropriate.

FIG. 19B shows the game image when the game character makes the release movement. In this case, when the player has performed the second operation input, the ball object is removed from the hand of the character and starts the movement. A movement state display object 530 is displayed corresponding to the moving path of the ball determined according to the release movement. In FIG. 19B, the movement state display object 530 is displayed which indicates that the ball curves to the left.

The above embodiments have been described taking an example of using the acceleration sensor. Note that the invention is not limited thereto. For example, a velocity sensor, a sensor which measures displacement, or the like may be used.

The above embodiments have been described taking an example of detecting the acceleration values of the three axes using the acceleration sensor. Note that the invention is not limited thereto. For example, the acceleration values of two axes or one axis may be detected.

The above embodiments have been described taking a baseball game as an example. Note that the invention may be applied to various other games. For example, the invention may be applied to a ball game such as soccer, golf, and the like.

The above embodiments have been described taking an example in which the game character pitches the object. Note that the invention is not limited thereto. For example, the game character may kick the object such as in soccer, or the game character may hit the object such as in golf.

The invention may be applied to various image generation systems such as an arcade game system, a consumer game system, a large-scale attraction system in which a number of players participate, a simulator, a multimedia terminal, a system board which generates a game image, and a portable telephone.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A non-transitory computer readable information storage medium storing a program for causing a computer to function, the program comprising:
    game processing instructions which perform a game process of causing a game character to make a predetermined movement for a given object based on an operation input from an operation input device having a movement sensor and causing the given object to move in an object space; and
    image generation instructions which generate an image of the object space viewed from a virtual camera;
    the game processing instructions including:
        operation input detection instructions which detect whether or not a plurality of operation inputs including a first operation input and a second operation input have been performed based on an output value from the movement sensor, the second operation input being separately performed from the first operation input;
        character movement control instructions which control the game character to make a predetermined movement based on one of the first operation input and the second operation input; and
        object movement control instructions which control a movement state of the given object based on another one of the first operation input and the second operation input,
    wherein the movement sensor detects a change in position, orientation or rotation of the operation input device, the movement sensor being configured to sense movement in at least two orthogonal directions, and
    wherein the object movement control instructions set a power value as a game parameter based on the first operation input, the power value being set during a charging state where the movement state and the movement result of the given object is not executed until after the charging state is completed, and the object movement control instructions control the movement state and the movement result of the given object based on the set power value.

2. The information storage medium as defined in claim 1, wherein the character movement control instructions control the game character to make a predetermined movement based on the first operation input; and
wherein the object movement control instructions control the movement state of the given object based on at least one of the first operation input and the second operation input.

3. The information storage medium as defined in claim 1, wherein the operation input detection instructions detect whether or not the operation input has been performed based on the output value from the movement sensor and an operation input from an operation input sensor other than the movement sensor provided in the operation input device.

4. The information storage medium as defined in claim 1, wherein the object movement control instructions control at least one of a moving direction, a moving path, and a moving pattern of the given object based on at least one of the first operation input and the second operation input.

5. The information storage medium as defined in claim 1, wherein the object movement control instructions control the game character to make a movement for storing the power value based on the first operation input.

6. The information storage medium as defined in claim 1, wherein the operation input detection instructions determine a presence or absence of the first operation input, or a start or completion of the first operation input based on the output value from the movement sensor and an operation input from an operation input sensor other than the movement sensor provided in the operation input device.

7. The information storage medium as defined in claim 1, wherein the operation input detection instructions set a first operation input acceptance time, and does not accept the first operation input when the acceptance time has expired.

8. The information storage medium as defined in claim 1, wherein the game processing instructions include an adjustment section which sets an initial setting operation period in which an initial setting operation input is accepted, and adjusts a reference value for determining the output value from the movement sensor based on the output value from the movement sensor obtained by the operation input device in the initial setting operation period; and
wherein the operation input detection instructions detect the operation inputs by determining the output value from the movement sensor based on the adjusted reference value.

9. The information storage medium as defined in claim 1, wherein the game processing instructions include a movement display object display control instructions that perform a display control process of a movement display object for displaying information of the movement of the game character performed when the operation inputs have been detected; and
wherein the image generation instructions generate a game image including the movement display object.

10. The information storage medium as defined in claim 1, wherein the game processing instructions include a movement state display object display control instructions that perform a display control process of a movement state display object for displaying information about control of the movement state of an object performed when the operation inputs have been detected; and
wherein the image generation instructions generate a game image including the movement state display object.

11. The information storage medium as defined in claim 1, wherein the operation input detection instructions set a time limit corresponding to each of the operation inputs, and does not accept each operation input when the time limit for each operation input has expired.

12. The information storage medium as defined in claim 1, wherein the operation input detection instructions set a total time limit for the operation inputs, sets a time limit for a subsequent operation input based on a time required for a preceding operation input and the total time limit, and does not accept an operation input when the set time limit has expired.

13. The information storage medium as defined in claim 1, wherein the operation input detection instructions detect whether or not the operation inputs have been performed based on an output value from a first movement sensor provided in a first controller and an output value from a second movement sensor provided in a second controller.

14. The information storage medium as defined in claim 1, wherein the second operation input is an operation input separately performed after the first operation input.

15. The information storage medium as defined in claim 1, wherein the object movement control instructions detect duration of one of the first operation input and the second operation input, and determines a power value stored by the first operation input based on the duration.

16. The information storage medium as defined in claim 1, wherein the operation input detection instructions detect whether or not the operation input device is held in a predetermined posture based on the output value from the movement sensor, and determines that the first operation input or second operation input, has been performed when the operation input device is held in the predetermined posture.

17. The information storage medium as defined in claim 1, wherein the object movement control instructions detect information on orientation or rotation of a controller based on at least one of the first operation input and the second operation input, and controls at least one of a moving direction, a moving path, and a moving pattern of the given object based on the information on orientation or rotation.

18. The information storage medium as defined in claim 1, wherein the predetermined movement is a shaking pattern that includes an oscillation along a single axis.

19. The information storage medium as defined in claim 18, wherein the shaking pattern is a substantially lateral or vertical shaking pattern.

20. The information storage medium as defined in claim 1, wherein the first operation input is shaking input, and the object movement control instructions set a power value based on the duration of the shaking input.

21. An image generation system comprising:
an operation input device having a movement sensor configured to detect a change in position, orientation or rotation of the operation input device, the movement sensor being configured to sense movement in at least two orthogonal directions;
at least one hardware processor programmed to:
generate an image of the object space viewed from a virtual camera,
perform a game process of causing a game character to make a predetermined movement for a given object based on an operation input from the movement sensor and causing the given object to move in an object space,
detect whether or not a plurality of operation inputs including a first operation input and a second operation input for causing the game character to make a predetermined movement have been performed based on an output value from the movement sensor, the second operation input being separately performed from the first operation input,
control the game character to make a predetermined movement based on one of the first operation input and the second operation input, and
control a movement state and a movement result of the given object based on another one of the first operation input and the second operation input, wherein a power value is set as a game parameter based on the first operation input, the power value being set during a charging state where the movement state and the movement result of the given object is not executed until after the charging state is completed, and the movement state and the movement result of the given object are controlled based on the set power value.

22. A non-transitory computer readable information storage medium storing a program for causing a computer to perform the following processes:
performing a game process of causing a game character to make a predetermined movement for a given object based on an operation input from an operation section including a movement sensor and causing the given object to move in an object space; and
generating an image of the object space viewed from a virtual camera;

detecting whether or not a plurality of operation inputs including a first operation input and a second operation input for causing the game character to make a predetermined movement have been performed based on an output value from the movement sensor, the second operation input being separately performed from the first operation input;

controlling the game character to make a predetermined movement based on one of the first operation input and the second operation input; and controlling a movement state of the given object based on another one of the first operation input and the second operation input, wherein the movement sensor detects a change in position, orientation or rotation of an operation input device, the movement sensor being configured to sense movement in at least two orthogonal directions, and wherein the object movement control section sets a power value as a game parameter based on the first operation input, the power value being set during a charging state where the movement state and the movement result of the given object is not executed until after the charging state is completed, and the object movement control section controls the movement state and the movement result of the given object based on the set power value.

23. An electronic apparatus comprising:

an operation input device having a movement sensor configured to detect a change in position, orientation or rotation of the operation input device, the movement sensor being configured to sense movement in at least two orthogonal directions;

at least one hardware processor programmed to:
   generate an image of an object space viewed from a virtual camera;
   perform a game process of causing a game character to make a predetermined movement for a given object based on the operation input from the movement sensor and causing the given object to move in the object space,
   detect whether or not a plurality of operation inputs including a first operation input and a second operation input for causing the game character to make a predetermined movement have been performed based on an output value from the movement sensor, the second operation input being separately performed from the first operation input;
   control the game character to make a predetermined movement based on one of the first operation input and the second operation input, and
   control a movement state and a movement result of the given object based on another one of the first operation input and the second operation input, wherein
   a power value is set as a game parameter based on the first operation input, the power value being set during a charging state where the movement state and the movement result of the given object is not executed until after the charging state is completed, and the movement state and the movement result of the given object are controlled based on the set power value.

* * * * *